US009563915B2

(12) United States Patent
Brady et al.

(10) Patent No.: US 9,563,915 B2

(45) Date of Patent: Feb. 7, 2017

(54) EXTRACTING PURCHASE-RELATED INFORMATION FROM DIGITAL DOCUMENTS

(71) Applicant: Slice Technologies, Inc., Palo Alto, CA (US)

(72) Inventors: Scott J. Brady, Menlo Park, CA (US); Benjamin A. Suppe, San Francisco, CA (US); Eric J. Botto, Palo Alto, CA (US); Harpinder Singh Madan, Foster City, CA (US); Ievgen Mastierov, Mountain View, CA (US); Aditya Khosla, Sunnyvale, CA (US); Dmytry B. Mykhaylov, San Jose, CA (US); Georgii Verbytskyi, Odessa (UA); Alexander Lototsky, Odessa (UA); Michael Mantel, Bevery Hills, CA (US)

(73) Assignee: Slice Technologies, Inc., San Mateo, CA (US)

( * ) Notice: Subject to any disclaimer, the term of this patent is extended or adjusted under 35 U.S.C. 154(b) by 0 days.

(21) Appl. No.: 14/684,658

(22) Filed: Apr. 13, 2015

(65) Prior Publication Data

US 2015/0235301 A1 Aug. 20, 2015

Related U.S. Application Data

(63) Continuation of application No. 13/349,287, filed on Jan. 12, 2012, which is a continuation-in-part of (Continued)

(51) Int. Cl.

*G06Q 30/06* (2012.01)

*G06Q 10/08* (2012.01)

(Continued)

(52) U.S. Cl.

CPC ...... *G06Q 30/0635* (2013.01); *G06Q 10/0833* (2013.01); *G06Q 10/107* (2013.01)

(58) Field of Classification Search

CPC G06F 17/30; G06F 17/30572; G06F 17/2705; G06F 17/30876; G06F 21/32; G06F 21/62; G06F 15/173; G06F 2009/4557; G06F 2009/45575; G06F 21/31; G06F 21/554; G06F 8/38; G06F 9/45558; G06Q 20/209; G06Q 30/0222; G06Q 30/0621

(Continued)

(56) References Cited

U.S. PATENT DOCUMENTS 5,664,109 A * 9/1997 Johnson .................. G06F 19/00 705/2

5,864,848 A 1/1999 Horvitz et al.

(Continued)

FOREIGN PATENT DOCUMENTS

| | | |
|---|---|---|
| EP | 1139264 A2 | 10/2001 |
| WO | 0137540 A | 5/2001 |
| WO | 0137540 A2 | 5/2001 |

OTHER PUBLICATIONS

Final Office Action dated Mar. 25, 2016 in related U.S. Appl. No. 14/684,954, filed Apr. 13, 2015.

(Continued)

*Primary Examiner* — Anthony Mejia

*Assistant Examiner* — Linh T Nguyen

(74) *Attorney, Agent, or Firm* — Law Office of Edouard Garcia

(57) ABSTRACT

Product order and shipping information received via email messages is automatically aggregated for ready user review. Once the user is authenticated, authorization to access their email mailbox is obtained and the email message headers of (Continued)

their entails are analyzed to identify those messages of interest. The bodies of the email messages of interest are parsed to extract the product order and shipping information which is stored and presented for display to the user typically grouped by individual product thus greatly simplifying user review of orders. The aggregated product order and shipping information can be augmented with additional information such as shipping status, delivery status, a product image, and/or a last date that the product can be returned.

20 Claims, 13 Drawing Sheets

Related U.S. Application Data application No. 13/185,943, filed on Jul. 19, 2011, now Pat. No. 8,844,010.

(51) Int. Cl.
*G06Q 10/10* (2012.01)
*G06F 15/16* (2006.01)

(58) Field of Classification Search
USPC ............... 709/201, 219, 206, 207, 203, 238; 705/26.1, 27.2, 14.23, 26.41, 330
See application file for complete search history.

(56) References Cited

U.S. PATENT DOCUMENTS 6,772,130 B1 8/2004 Karbowski et al.
7,082,426 B2 * 7/2006 Musgrove ......... G06F 17/30864
7,197,449 B2 3/2007 Hu et al.
7,627,641 B2 12/2009 Aslop et al.
7,747,693 B2 6/2010 Banister et al.
7,783,515 B1 8/2010 Kumar et al.
7,788,262 B1 8/2010 Shirwadkar
7,899,871 B1 3/2011 Kumar et al.
7,917,548 B2 3/2011 Gibson et al.
8,055,999 B2 11/2011 Dames et al.
8,095,597 B2 * 1/2012 Rawat .................. G06Q 10/107 709/206
8,230,323 B2 7/2012 Bennett et al.
8,233,751 B2 7/2012 Patel et al.
8,458,054 B1 * 6/2013 Thakur ............. G06F 17/30265 705/27.1
8,527,436 B2 9/2013 Salaka et al.
8,666,812 B1 3/2014 Gandhi
8,676,815 B2 3/2014 Deng et al.
8,903,924 B2 12/2014 Jensen et al.
2001/0016819 A1 8/2001 Kolls
2002/0046248 A1 4/2002 Drexler
2002/0065884 A1 5/2002 Donoho et al.
2002/0091776 A1 7/2002 Nolan et al.
2002/0156817 A1 * 10/2002 Lemus .............. G06F 17/30569 715/256
2002/0174185 A1 11/2002 Rawat et al.
2003/0105681 A1 * 6/2003 Oddo ..................... G06Q 30/02 705/26.62
2004/0044587 A1 3/2004 Schwartzman
2004/0044674 A1 3/2004 Mohammadioun et al.
2004/0064373 A1 4/2004 Shannon
2004/0177120 A1 9/2004 Kirsch
2004/0199595 A1 10/2004 Banister et al.
2004/0205737 A1 10/2004 Margaliot et al.
2005/0050099 A1 3/2005 Bleistein et al.
2005/0184152 A1 * 8/2005 Bornitz .................. G06Q 10/08 235/385
2005/0210016 A1 9/2005 Brunecky
2005/0246269 A1 11/2005 Smith
2006/0088214 A1 * 4/2006 Handley ............ G06K 9/00469 382/176
2006/0122899 A1 6/2006 Lee et al.
2006/0206063 A1 9/2006 Kagan et al.
2006/0206306 A1 9/2006 Cao et al.
2006/0282442 A1 12/2006 Lennon et al.
2006/0288268 A1 12/2006 Srinivasan et al.
2007/0069013 A1 3/2007 Seifert et al.
2007/0156732 A1 7/2007 Surendran et al.
2007/0294127 A1 12/2007 Zivov
2008/0072140 A1 3/2008 Vydiswaran et al.
2008/0073429 A1 3/2008 Oesterling et al.
2008/0147525 A1 6/2008 Allen et al.
2008/0228466 A1 9/2008 Sudhakar
2008/0288486 A1 * 11/2008 Kim .................. G06F 17/30905
2008/0307046 A1 12/2008 Baek et al.
2009/0089209 A1 * 4/2009 Bixler .................. G06Q 20/102 705/40
2009/0204545 A1 8/2009 Barsukov
2009/0300482 A1 12/2009 Summers et al.
2009/0313101 A1 * 12/2009 McKenna .......... G06Q 10/0637 705/14.25
2009/0313132 A1 * 12/2009 McKenna et al. ... G06Q 20/204 705/17
2009/0327268 A1 12/2009 Denney et al.
2010/0082754 A1 4/2010 Bryan et al.
2010/0121775 A1 5/2010 Keener et al.
2010/0257066 A1 10/2010 Jones et al.
2011/0078724 A1 3/2011 Mehta et al.
2011/0191206 A1 * 8/2011 Kiarostami ........ G06Q 30/0641 705/26.8
2011/0246239 A1 10/2011 Vdovjak et al.
2012/0047014 A1 2/2012 Smadja et al.
2012/0203632 A1 8/2012 Blum et al.
2012/0284150 A1 * 11/2012 Stanley ................ G06Q 10/087 705/27.1
2012/0330971 A1 12/2012 Thomas et al.
2013/0024282 A1 1/2013 Kansal et al.
2013/0024525 A1 1/2013 Brady et al.
2013/0024924 A1 1/2013 Brady et al.
2013/0151631 A1 * 6/2013 Jensen .................... H04L 51/18 709/206
2013/0339145 A1 12/2013 Blum et al.
2014/0105508 A1 4/2014 Arora
2014/0229160 A1 8/2014 Galle
2014/0358814 A1 12/2014 Brady et al.
2015/0235166 A1 8/2015 Brady et al.

OTHER PUBLICATIONS

Applicant Initiated Interview Summary dated Mar. 2, 2016 in related U.S. Appl. No. 14/684,954, filed Apr. 13, 2015.
Response After Final Action dated Feb. 24, 2016 in related U.S. Appl. No. 14/684,954, filed Apr. 13, 2015.
Final Rejection dated Feb. 1, 2016 in related U.S. Appl. No. 14/684,954, filed Apr. 13, 2015.
Comments on Prior Art dated Sep. 17, 2015 in related U.S. Appl. No. 13/349,287, filed Jan. 12, 2012.
Amendment After Final dated Sep. 16, 2015 in related U.S. Appl. No. 13/349,287, filed Jan. 12, 2012.
Final Office Action dated Sep. 9, 2015 in related U.S. Appl. No. 13/349,287, filed Jan. 12, 2012.
Amendment dated May 11, 2015 in related U.S. Appl. No. 13/349,287, filed Jan. 12, 2012.
Non-Final Rejection dated Mar. 3, 2015 in related U.S. Appl. No. 13/349,287, filed Jan. 12, 2012.
Supplemental Amendment dated Jan. 19, 2015 in related U.S. Appl. No. 13/349,287, filed Jan. 12, 2012.
RCE/Amendment dated Jul. 21, 2014 in related U.S. Appl. No. 13/349,287, filed Jan. 12, 2012.
Response After Final dated Apr. 24, 2014 in related U.S. Appl. No. 13/349,287, filed Jan. 12, 2012.
Applicant Initiated Interview dated Mar. 20, 2014 in related U.S. Appl. No. 13/349,287, filed Jan. 12, 2012.
Final Rejection dated Jan. 24, 2014 in related U.S. Appl. No. 13/349,287, filed Jan. 12, 2012.
Amendment dated Aug. 21, 2013 in related U.S. Appl. No. 13/349,287, filed Jan. 12, 2012.

(56) References Cited

OTHER PUBLICATIONS

Non-Final Rejection dated Aug. 13, 2013 in related U.S. Appl. No. 13/349,287, filed Jan. 12, 2012.
Amendment dated Sep. 17, 2015 in related U.S. Appl. No. 14/684,954, filed Apr. 13, 2015.
Non-Final Office Action dated Aug. 31, 2015 in related U.S. Appl. No. 14/684,954, filed Apr. 13, 2015.
E. Ukkonen, "On-Line Construction of Suffix Trees," Algorithmica, Sep. 1995, vol. 14, Issue 3, pp. 249-260 (1995).
Hammer, E, "Beginner's Guide to OAuth-Part II: Protocol Workflow", in Hueniverse.com (http://web.archive.org/web/20110628182659/http://hueniverse.com/2007/10/beginners-guide-to-oauth-part-ii-protocol-workflow/), Jun. 28, 2011, pp. 1-13.
Johnson, D., "Sidebar: What is OAuth and why should you care?". in Slogging Roller (http://web.archive.org/web/20090328010141/http://rollerweblogger.org/roller/entry/sidebar_what_is_oauth), Mar. 28, 2009, pp. 1-3.
Lu, Jianguo, "03-60-214 Computer Languages, Grammars, and Translators", course lecture slides in School of Computer Science, University of Windsor (http://www.raw-d.com/cs/w2011/214/214-1.pdf), Feb. 11, 2011, pp. 0-17.
Mnohar, V. "What is OpenID and how can I use it?", in Vineet Manohar's Blog: Java, Web 2.0 and other Tech topics (http://web.archive.org/web/20101129061954/http://www.vineetmanohar.com/2009/08/what-is-openid-and-how-can-i-use-it/), Nov. 29, 2010, pp. 1-10.
Rajesh Pampapathi, "A Suffix Tree Approach to Anti-Spam Email Filtering," Machine Learning, Oct. 2006, vol. 65, Issue 1, pp. 309-338.
Unknown "ANTLR Parser Generator", in ANTLR.org (http://web.archive.org/web/20100620094636/http://www.antir.org/) archived Jun. 20, 2010, pp. 1-3.
Unknown, "Authentication and Authorization for Google APIs OAuth 1.0 for Web Applications", in code.google.com (http://web.archive.org/web/20110429191850/http://code.google.com/apis/accountsfdocs/OAuth.html), archived Apr. 29, 2011, pp. 1-7.
Unknown, "Backus-Naur Form", in Wikipedia (http://web.archive.org/web/20100703105305/http://en.wikipedia.org/wiki/Backus-Naur_form), archived Jul. 3, 2010, pp. 1-7.
Unknown, "Context-Free Grammar", in Wikipedia (http://web.archive.org/web/20100210122803/http://en.wikipedia.org/wiki/Context-free_grammar), archived Feb. 10, 2010, pp. 1-17.
Unknown, "Data deduplication", in Wikipedia (http://en.wikipedia.org/wiki/Data_deduplication), accessed May 27, 2011, pp. 1-7.
Unknown, "Email protocols: POP, IMAP and MAPI", in Information Technology, Miller School of Medicine at the University of Miami (http://web.archive.org/web/20100609164258/http://it.med.miami.edu/x1111.xml), archived Jul. 14, 2010, pp. 1-5.
Unknown, "Introduction: OAuth", in Oauth.net (http://web.archive.org/web/20071011194615/http://oauth.net/about/), Sep. 5, 2007, pp. 1-4.
Unknown, "Lexers vs parsers", in stackoverflow.com (http://web.archive.org/web/20100901022827/http://stackoverflow.com/questions/2842809/lexers-vs-parsers), Sep. 1, 2010, pp. 1-5.
Unknown, "OAuth", in Wikipedia (http://web.archive.org/web/20100618202240/http://en.wikipedia.org/wiki/OAuth), archived Jun. 18, 2010, pp. 1-3.
Unknown, "Open ID Explained", in openidexplained.com (http://web.archive.org/web/20100218112551/http://openidexplained.com/), archived Feb. 18, 2010, pp. 1-6.
Unknown, "Open ID" in Wikipedia (http://web.archive.org/web/20100623215831/http://en.wikipedia.org/wiki/OpenID), archived Jun. 23, 2010, pp. 1-17.
Unknown, "Parsing", in Wikipedia (http://web.archive.org/web/20100528225235/http://en.wikipedia.org/wiki/Parsing), archived May 28, 2010, pp. 1-7.
Unknown, "Terminology", in Hueniverse.com (http://web.archive.org/web/20100101123341/http://hueniverse.com/oauth/guide/terminology), Dec. 26, 2009, pp. 1-8.
Unknown, "What is OpenID?", in openid.net (http://web.archive.org/web/20100713025959/http://openid.net/get-an-openid/what-is-openid/), archived Jul. 13, 2010, p. 1.
Unkown, "Authentication and Authorization for Google APIs: Federated Login for Google Account Users", in code. google.com (http://web.archive.org/web/20100614141450/http://code.google.com/apis/accounts/docs/OpenID.html), archived Jun. 14, 2010, pp. 1-16.
Wikipedia, "Cluster analysis," http://en.wikipedia.org/wiki/Cluster_analysis#Density-based_clustering, 19 pages, downloaded Sep. 15, 2014.
Wikipedia, "DBSCAN," http://en.wikipedia.org/wiki/DBSCAN, 6 pages, downloaded Sep. 15, 2014.
Wikipedia, "Naive Bayes classifier," http://en.wikipedia.org/wiki/Naive_Bayes_classifier, 11 pages, downloaded Sep. 15, 2014.
Wikipedia, "Suffix tree," http://en.wikipedia.org/wiki/Suffix_tree, 8 pages, downloaded Sep. 15, 2014.
Amendment dated Mar. 29, 2016 in related U.S. Appl. No. 14/457,421, filed Aug. 12, 2014.
Non-Final Rejection dated Mar. 16, 2016 in related U.S. Appl. No. 14/457,421, filed Aug. 12, 2014.
Advisory Action dated Jun. 16, 2016 in related U.S. Appl. No. 14/684,954, filed Apr. 13, 2015.
Response After Final Action dated May 19, 2016 in related U.S. Appl. No. 14/684,954, filed Apr. 13, 2015.

* cited by examiner

Order/Shipping Information Aggregation Application Window

| Order Date | Item Description | Price | Merchant | Status |
|---|---|---|---|---|
| May 25, 2011 | iPad 2 tablet computing device (Order No. 123456) | $499.00 | Apple | Shipped |
| May 23, 2011 | Canon digital camera model no. 712 (Order No. 987654) | $217.99 | Amazon | Ordered |
| May 19, 2011 | Nike running shoes model no. XYZ (Order No. MNZ12ZY) | $113.99 | Nike Store | Delivered |
| May 11, 2011 | "Successful Startups" book by Bill Gates (Order No. 12ABC34) | $14.99 | Amazon | Delivered |

601 603 605 607 609 611

FIG. 10
Exemplary Shipping Company Aliases

US Mail
UNITED STATES POSTAL SERVICE
UNITED STATES POSTAL SERVICES
US POSTAL SERVICE
U.S. POSTAL SERVICE
MAIL EXPRESS
ARGIX-USPS

UPS Mail Innovations
UPS MAIL INNOVATION
UPS MAIL INNOVATIONS
US MAIL

Federal Express
FEDERAL EXPRESS
FEDEX PRIORITY OVERNIGHT
FEDEX GROUND
FEDEXGROUND
FDX_HOME
FED
FXSP
FXSP STANDARD
FEDX
EXPRESS SHIP
FED-EX EXPRESS SAVER
FEDEX SMARTPOST
FEDEX SMART POST
SMARTPOST
SMART POST
RPS

UPS
WWWAPPS.UPS.COM
UNITED PARCEL SERVICE
UPSH
UPSN
UPS AIR
UPS STANDARD GROUND
UPS GROUND
UPS BASIC
UPSBSC02
UPS 2ND DAY AIR
UPS FREIGHT

DHL
SMART MAIL

OnTrac
ONTRAC-CA

DHL Global Mail
(no aliases)

EXTRACTING PURCHASE-RELATED INFORMATION FROM DIGITAL DOCUMENTS

CROSS-REFERENCE TO RELATED APPLICATIONS

This application is a continuation of U.S. patent application Ser. No. 13/349,287, filed Jan. 12, 2012, which is a continuation-in-part of U.S. patent application Ser. No. 13/185,943 (now U.S. Pat. No. 8,844,010), filed Jul. 19, 2011. The disclosures of U.S. patent application Ser. Nos. 13/349,287 and 13/185,943 are both incorporated herein by reference.

This application also relates to the following co-pending applications: U.S. patent application Ser. No. 14/457,421, filed Aug. 12, 2014; U.S. patent application Ser. No. 14/684,954, filed Apr. 13, 2015; U.S. patent application Ser. No. 14/519,919, filed Oct. 21, 2014; and U.S. patent application Ser. No. 14/519,975, filed Oct. 21, 2014.

BACKGROUND OF THE INVENTION

Field of the Invention

The present invention relates generally to gathering product order and shipping information and in particular to augmenting and aggregating such information that was communicated by email.

Description of the Prior Art

The acquisition of goods and services (hereinafter individually and collectively referred to as product) is ever increasing. Further, such acquisitions are commonly handled electronically today either by an online purchase or an electronic confirmation of such purchase. For example, it is common today to place an order with an online merchant such as AMAZON.COM® of Seattle, Wash. The online merchant then typically sends to the purchaser an order confirmation in an electronic form such as an email message. Subsequently, the online merchant and/or shipping company typically sends a shipping confirmation to the purchaser also in an electronic form such as an email message. While such transactions have become increasingly common and quite convenient, this convenience comes with some downsides as well.

A typical prior art online transaction scenario will now be explained with reference to FIG. 1. As shown in FIG. 1, a user operating a user computing device 101 such as a personal computer, handheld computing device or smartphone communicates across a network 102 such as the internet to an online merchant 104 to shop for and consummate an online transaction to acquire some product. This is typically performed by the user operating an application such as a web browser running on the user computing device 101. When the online transaction is complete, online merchant 104 typically sends details of the completed transaction to the user computing device 101 for display to the user typically in a window of the same application running on the user computing device 101. Online merchant 104 also typically sends an email message to the user of user computing device 101 confirming the transaction. Such an order confirmation email message is typically sent from the online merchant 104 to an email server 106 which is accessible to the user computing device 101 via an email application running on the user computing device 101. Subsequently, when the order is ready to be shipped to the user either by the online merchant 104 or by a shipping company 108 acting on behalf of the online merchant 104, a shipping confirmation email message is typically sent from either the online merchant 104 or the shipping company 108 to the email server 106 which is, again, accessible to the user computing device 101 via the email application running on the user computing device. In this way, the user who consummates an online transaction to acquire some product receives an order confirmation and a shipping confirmation of the ordered product.

Referring now to FIG. 2, an exemplary prior art display window 200 of an email application as may be running on the user computing device 101 of FIG. 1 can be seen. As shown in window 200 of the email application is a column of email message folders 201 (e.g., an inbox folder, a Sent Items folder, a Deleted Items folder and a Spam folder) on the left hand side with the Inbox folder underlined and in bold thereby indicating that it is the currently selected email message folder for display. Next to the email message folders column 201 is a slider bar 203, an email message sender column 205, a message subject line column 207 and an email message sent date column 209. Each displayed email message line in the email message sender column 205, the message subject line column 207 and the email message sent date column 209 corresponds to a single email message and, as is known in the art, slider bar 203 can be used to scroll the displayed email message lines up and down in window 200.

In this way, a user of the email application can view a limited portion of a number of the email messages received by the email application. In particular, in the example shown in FIG. 2, the user can view limited portions of various email messages received by the email application sent from email message senders such as "Bob Smith," "Mary Jones," "John Green," "Lisa Adams," etc., as indicated in email message send column 205. As also shown in this example are limited portions of email messages received from senders such as "Apple" and "Amazon," which are email messages sent by APPLE INC.® of Cupertino, Calif. and AMAZON.COM® of Seattle, Wash., respectively.

The email messages sent by email message senders "Apple" and "Amazon" have corresponding email message subjects as indicated in email message subject line column 207 and corresponding email message sent dates as indicated in email message sent date column 209. In particular as shown in the figure there are two email messages indicated as being sent by Apple and one email message indicated as being sent by Amazon in the email message sender column 205.

The topmost email message indicated as being sent by Apple has a corresponding email message subject of "Shipping Confirmation Order No. . . . " as shown in the email message subject line column 207 (as is known in the art the remainder of the email message subject line text is cutoff, as indicated by the ellipses, due to the width constraints of the email message subject line column 207) and a corresponding email message sent date of "May 26, 2011." This indicates that Apple sent an email message on May 26, 2011 confirming shipment of an order. The next email message indicated as being sent by Apple has a corresponding email message subject of "Order Confirmation—Order No. . . . " with a corresponding email message sent date of "May 25, 2011." This indicates that Apple sent an email message on May 25, 2011 confirming that an order has been placed.

Of course, as is common and known in the art, other information about the shipping confirmation and other information about the order confirmation is contained in the respective email messages themselves (either in the cutoff portion of the email message subject line or the email message body itself) despite not being shown in the email application window 200. Such information can include, for example, the order number, the shipping date, the expected delivery date, the item or items ordered, including their descriptions and quantity, the individual and/or total price paid including any taxes and/or shipping costs, etc. However, as indicated by the example of FIG. 2, such further information is not typically displayed in the email application window 200 thus requiring the user to open each individual email message for display in order to be able to view the further information contained therein. While perhaps not too problematic for a user who has only recently ordered few items, this can become quite troublesome for a user who orders more items over time and particularly when those items are ordered from more than one online merchant and may be shipped by more than one online merchant or shipping company. In this latter case, the user wishing to check what was ordered and when, or wishing to check the shipping status of an order, or wishing to see what the ordered item looks like, finds himself wading through numerous old email messages to find the desired information, having to use the scroll bar 203 to review the hundreds or thousands of old email message lines displayed in email application window 200 by sender, subject and sent date, and may also require moving between those message items displayed in the Inbox folder and those messages displayed in the Deleted Items folder (or those message items displayed in an Archived Items folder (not shown)). This problem is compounded when items are backordered (and the online merchant sends additional emails to that effect to the user), or when the user wants to return items, in which case the user must locate information (in the emails or online) about the return policy as well as details about the ordered items and their delivery.

What is needed, therefore, is a way for a user to more readily be able to view information about ordered items, as well as view updated shipping and delivery status information as it becomes available.

SUMMARY

In one embodiment is a method of augmenting aggregated product order and shipping information with shipping status information for an ordered product comprising: retrieving email message headers from an email mailbox of a user; identifying email messages of interest by analyzing the retrieved email message headers; retrieving from the email mailbox of the user email message bodies of the identified email messages of interest; parsing the retrieved email message bodies of the identified email messages of interest to extract the product order and shipping information; storing the extracted product order and shipping information; retrieving the stored extracted product order and shipping information for the ordered product to identify an online merchant of the ordered product; accessing a website of the identified online merchant to obtain shipping status data for the ordered product; and presenting for display to the user the extracted product order and shipping information, and the obtained shipping status for the ordered product.

In another embodiment is a method of augmenting aggregated product order and shipping information with delivery status information for an ordered product comprising: retrieving email message headers from an email mailbox of a user; identifying email messages of interest by analyzing the retrieved email message headers; retrieving from the email mailbox of the user email message bodies of the identified email messages of interest; parsing the retrieved email message bodies of the identified email messages of interest to extract the product order and shipping information; storing the extracted product order and shipping information; retrieving the stored extracted product order and shipping information for the ordered product to identify a shipper of the ordered product and a tracking number for the ordered product; obtaining delivery status information about the ordered product by accessing a website of the identified shipper and using the identified tracking number; and presenting for display to the user the extracted product order and shipping information, and the obtained delivery status information for the ordered product.

In another embodiment is a method of augmenting aggregated product order and shipping information with return policy information for an ordered product comprising: retrieving email message headers from an email mailbox of a user; identifying email messages of interest by analyzing the retrieved email message headers; retrieving from the email mailbox of the user email message bodies of the identified email messages of interest; parsing the retrieved email message bodies of the identified email messages of interest to extract the product order and shipping information; storing the extracted product order and shipping information; identifying an online merchant of the ordered product from the stored extracted product order and shipping information; retrieving from the identified online merchant a return policy of the online merchant; determining from the retrieved return policy a return policy type and a return policy time limit; calculating a last return date for the ordered product based on the determined return policy type and the determined return policy time limit; and presenting for display to the user the extracted product order and shipping information, and the calculated last return date for the ordered product.

In yet another embodiment is a method of augmenting aggregated product order and shipping information with an image of an ordered product, the method comprising: retrieving email message headers from an email mailbox of a user; identifying email messages of interest by analyzing the retrieved email message headers; retrieving from the email mailbox of the user email message bodies of the identified email messages of interest; parsing the retrieved email message bodies of the identified email messages of interest to extract the product order and shipping information; storing the extracted product order and shipping information; retrieving product information from the stored extracted product order and shipping information; using the retrieved product information to obtain the image of the ordered product; and presenting for display to the user the extracted product order and shipping information, and the image of the ordered product.

In still another embodiment is a system to augment aggregated product order and shipping information for an ordered product comprising: a computing device; an email server; and a database coupled to the computing device; wherein the computing device is configured to communicate across a network with the email server to retrieve email messages from an email mailbox of a user, the email messages being parsed to extract product order and shipping information about the ordered product; store the extracted product order and shipping information about the ordered product on the database; retrieve the extracted product order and shipping information for the ordered product from the database; communicate across the network with an online merchant using the stored extracted product order and shipping information to acquire updated shipping information and return policy information about the ordered product; communicate across the network with a shipping company using the stored extracted product order and shipping information to acquire product delivery information about the ordered product; communicate across the network with the search engine server or the online merchant using the stored extracted product order and shipping information to acquire an image of the ordered product; and communicate across the network with a user computing device to display for the ordered product the retrieved product order and shipping information, the updated shipping information, the product delivery information, the return policy information, and the product image.

In another embodiment is a non-transitory computer readable medium having stored thereupon computing instructions comprising: a code segment to retrieve email message headers from an email mailbox of a user; a code segment to identify email messages of interest by analyzing the retrieved email message headers; a code segment to retrieve from the email mailbox of the user email message bodies of the identified email messages of interest; a code segment to parse the retrieved email message bodies of the identified email messages of interest to extract the product order and shipping information; a code segment to store the extracted product order and shipping information; a code segment to retrieve the stored extracted product order and shipping information for the ordered product to identify an online merchant of the ordered product; a code segment to access a website of the identified online merchant to obtain shipping status data for the ordered product; and a code segment to present for display to the user the extracted product order and shipping information, and the obtained shipping status for the ordered product.

In yet another embodiment is a non-transitory computer readable medium having stored thereupon computing instructions comprising: a code segment to retrieve email message headers from an email mailbox of a user; a code segment to identify email messages of interest by analyzing the retrieved email message headers; a code segment to retrieve from the email mailbox of the user email message bodies of the identified email messages of interest; a code segment to parse the retrieved email message bodies of the identified email messages of interest to extract the product order and shipping information; a code segment to store the extracted product order and shipping information; a code segment to retrieve the stored extracted product order and shipping information for the ordered product to identify a shipper of the ordered product and a tracking number for the ordered product; a code segment to obtain delivery status information about the ordered product by accessing a website of the identified shipper and using the identified tracking number; and a code segment to present for display to the user the extracted product order and shipping information, and the obtained delivery status information for the ordered product.

In still another embodiment is a non-transitory computer readable medium having stored thereupon computing instructions comprising: a code segment to retrieve email message headers from an email mailbox of a user; a code segment to identify email messages of interest by analyzing the retrieved email message headers; a code segment to retrieve from the email mailbox of the user email message bodies of the identified email messages of interest; a code segment to parse the retrieved email message bodies of the identified email messages of interest to extract the product order and shipping information; a code segment to store the extracted product order and shipping information; a code segment to identify an online merchant of the ordered product from the stored extracted product order and shipping information; a code segment to retrieve a previously stored return policy of the online merchant; a code segment to determine from the retrieved return policy a return policy type and a return policy time limit; a code segment to calculate a last return date for the ordered product based on the determined return policy type and the determined return policy time limit; and a code segment to present for display to the user the extracted product order and shipping information, and the calculated last return date for the ordered product.

In yet another embodiment is a non-transitory computer readable medium having stored thereupon computing instructions comprising: a code segment to retrieve email message headers from an email mailbox of a user; a code segment to identify email messages of interest by analyzing the retrieved email message headers; a code segment to retrieve from the email mailbox of the user email message bodies of the identified email messages of interest; a code segment to parse the retrieved email message bodies of the identified email messages of interest to extract the product order and shipping information; a code segment to store the extracted product order and shipping information; a code segment to retrieve product information from the stored extracted product order and shipping information; a code segment to use the retrieved product information to obtain the image of the ordered product; and a code segment to present for display to the user the extracted product order and shipping information, and the image of the ordered product.

BRIEF DESCRIPTION OF DRAWINGS

FIG. 6 is an exemplary display of extracted product order and/or shipping information.

FIG. 10 is a list of exemplary shipping company aliases.

DETAILED DESCRIPTION OF THE INVENTION

Overcoming the limitations and challenges of the prior art, the present approach aggregates product order and shipping information received via order confirmation emails and shipping confirmation emails thus making it easier for a user to review such product orders.

Figure 1:
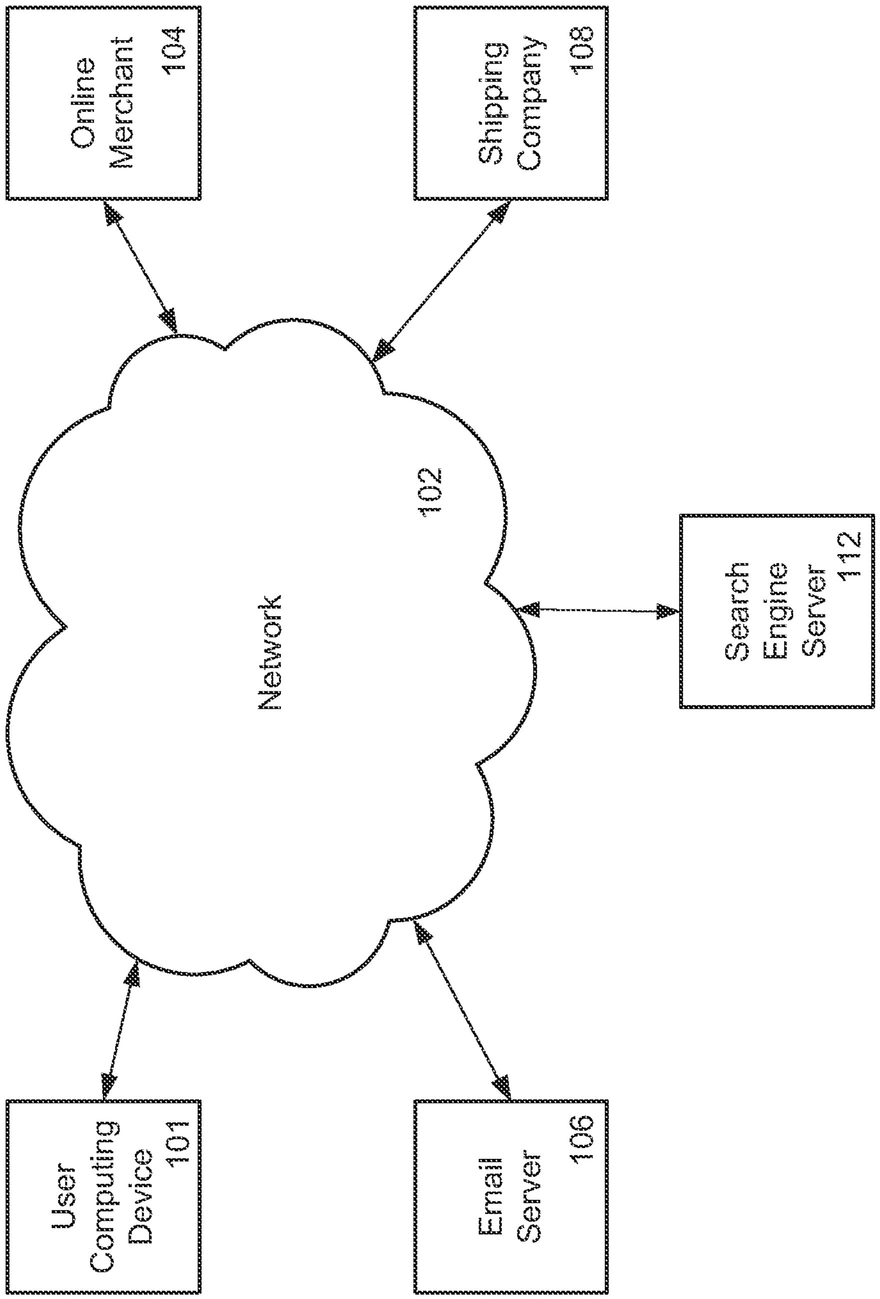
FIG. 1 is a typical prior art online transaction operating environment and scenario.
Figure 3:
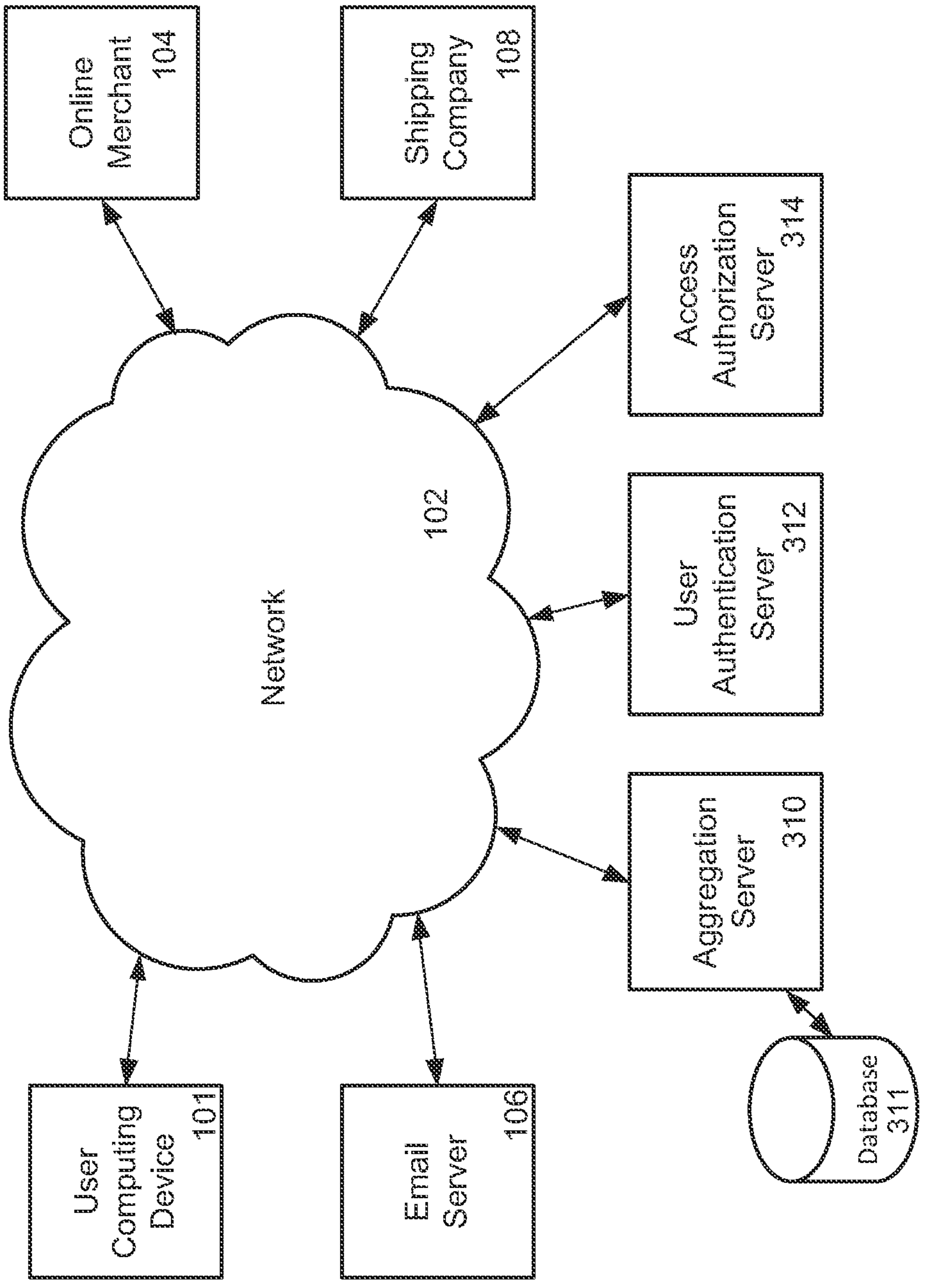
FIG. 3 is an exemplary embodiment and operating environment.

Referring now to FIG. 3, an exemplary embodiment and operating environment can be seen. As with the order and shipping process described with respect to FIG. 1, a user operating user computing device 101 such as a personal computer, handheld computing device or smartphone communicates across network 102 such as the internet to online merchant 104 to shop for and consummate an online transaction to acquire some product. This is typically performed by the user operating an application such as a web browser running on the user computing device 101. When the online transaction is complete, online merchant 104 typically sends details of the completed transaction to the user computing device 101 for display to the user typically in a window of the same web browser application running on the user computing device 101. Online merchant 104 also typically sends an email message to the user of user computing device 101 confirming the transaction. Such an order confirmation email message is typically sent from the online merchant 104 to email server 106 which is accessible to the user computing device 101 via an email application running on the user computing device 101. It is to be understood that email server 106 may be provided by the user's company or may be provided by a third party email service provider. Subsequently, when the order is ready to be shipped to the user either by the online merchant 104 or by the shipping company 108 acting on behalf of the online merchant 104, a shipping confirmation email message is typically sent from either the online merchant 104 or the shipping company 108 to the email server 106 which is, again, accessible to the user computing device 101 via the email application running on the user computing device.

Also present in the embodiment shown in FIG. 3 is an aggregation server 310. Aggregation server 310, as will be explained, aggregates the order information and the shipping information contained in the order confirmation email messages and the shipping confirmation email messages as explained herein. In particular, aggregation server 310 identifies the order confirmation email messages and the shipping confirmation email messages received in the user's email mailbox and parses them to extract the order information and the shipping information contained therein. Aggregation server 310 also stores in a database 311 the extracted order information and shipping information which extracted information can be sent across network 102 to user computing device 101 for display to the user typically grouped by individual product thus greatly simplifying user review of orders. It is to be understood that database 311 and its associated information containing records as described herein are but one possible embodiment and that any known data storage approach can likewise be used to store the information.

Also shown in FIG. 3 is a user authentication server 312 and an access authorization server 314 each optional in some embodiments. User authentication server 312 is used to authenticate a user in some embodiments and access authorization server 314 is used to obtain authorization to access the user's email mailbox in some embodiments, each as explained further elsewhere herein.

Figure 4:
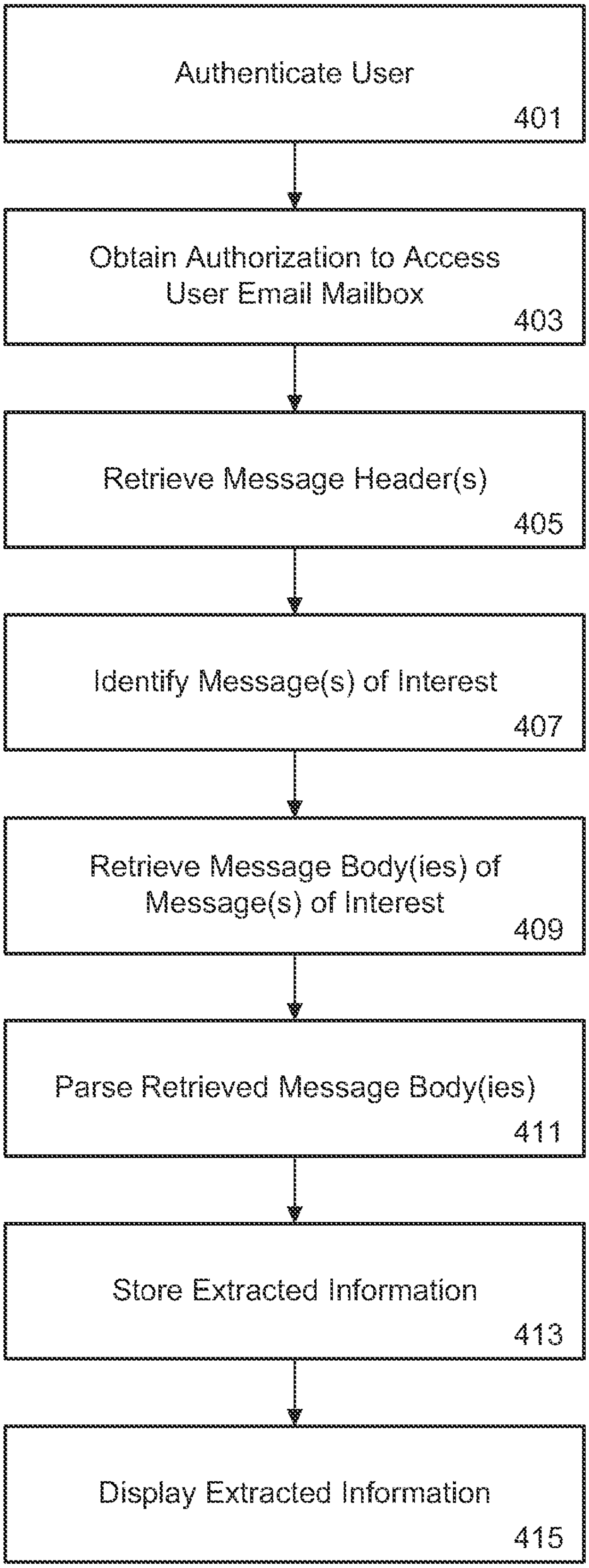
FIG. 4 is a flowchart depicting an aggregation method according to one embodiment.

Referring now to FIG. 4, a flowchart depicting a method according to one embodiment can be seen.

In step 401, the user is authenticated. As is known in the art user authentication is a process of verifying the identity of a user. Authenticating a user can be accomplished in any of a large variety of ways known in the art. Such authentication methods can include receiving from a user a user name and password or some biometric information such as a fingerprint or retinal scan or a security code or key which can then be compared with some stored, known or determined information to thereby authenticate the user. Receipt of such information can occur by it being communicated from user computing device 101 across network 102 to aggregation server 310 of FIG. 3, for example.

In some embodiments, operation of such user authentication methods can involve the user first registering with whomever is providing the order and shipping information aggregation service, for example by the user registering directly with aggregation server 310 using user computing device 101 to communicate with aggregation server 310 across network 102 of FIG. 3.

In other embodiments, third party user authentication services can be employed. For example, user authentication server 312 of FIG. 3 can be used to authenticate the user thereby avoiding having the user register with the aggregation service or share authentication information with the aggregation service. One example of a third party authentication service is one that complies with OpenID®, a known open standard for user authentication in a decentralized manner. In accordance with the OpenID standard, a user establishes an OpenID identifier using user computing device 101 to communicate across network 102 with user authentication server 312 which in this example is operating as an OpenID provider. Aggregation server 310 then receives the user's OpenID identifier from user computing device 101 across network 102. Aggregation server 310 can then communicate the user's OpenID identifier across network 102 to user authentication server 312 which can then authenticate the user on behalf of the user. It is to be understood that this OpenID third party authentication process is known in the art.

In step 403, authorization for the aggregation service to access the user's email mailbox is obtained. As is known in the art access authorization is a process of obtaining permission to enter and/or use some electronic or online resource. In some embodiments this is obtained directly from the user who themselves provides such authorization, for example by communicating the user's email user name and email password from user computing device 101 across network 102 to aggregation server 310 of FIG. 3.

In other embodiments this is obtained indirectly from the user who provides such authorization through a third party service such as, for example, access authorization server 314 of FIG. 3. For example, access authorization server 314 of FIG. 3 can be used to authorize the aggregation service to access the user's email mailbox thereby avoiding the user having to share their user credentials such as email user name and email password with the aggregation service. An example of a third party authorization service is one that complies with OAuth®, a known open standard for users to authorize access to private resources such as an email mailbox stored on one site with another site without having to share their user credentials such as email user name and email password with that other site. Following the OAuth standard, a user operating user computing device 101 obtains a token from access authorization server 314 across network 102 where the token grants access to a specific site such as email server 106. As is known in the art, the access granted via the token can be limited to specific resources, e.g., a particular email account, for a defined duration, e.g., the next 2 hours, etc., thus providing the user the comfort of and ability to control who has access to what and for how long. The token is then communicated by the user from user computing device 101 to aggregation server 310 across network 102 to thereby ultimately provide authorization to aggregation server 310 to access email server 106. Aggregation server 310 then uses the token, in accordance with a sequence of communications steps across network 102 involving user computing device 101, aggregation server 310, access authorization server 314 and email server 106, all as defined by the OAuth standard, to obtain authorized access to email server 106 across network 102. It is to be understood that this OAuth third party authorization process is known in the art.

In other embodiments, as appropriate taking into account such issues as privacy and legal authority, such authorization for the aggregation service to access the user's email mailbox is obtained directly from a provider of the email service. This may be appropriate in the case of an email service provider's user agreement granting the service provider the right to give such authorization. This may also be appropriate in the case of an email service provided by an employer to an employee as, for example, in the case of Yahoo! Inc. of Sunnyvale, Calif. which provides its employees with an email service called Yahoo! Mail, where by virtue of an employment contract or other agreement the employer has the right to authorize access to the employee's email mailbox.

Figure 2:
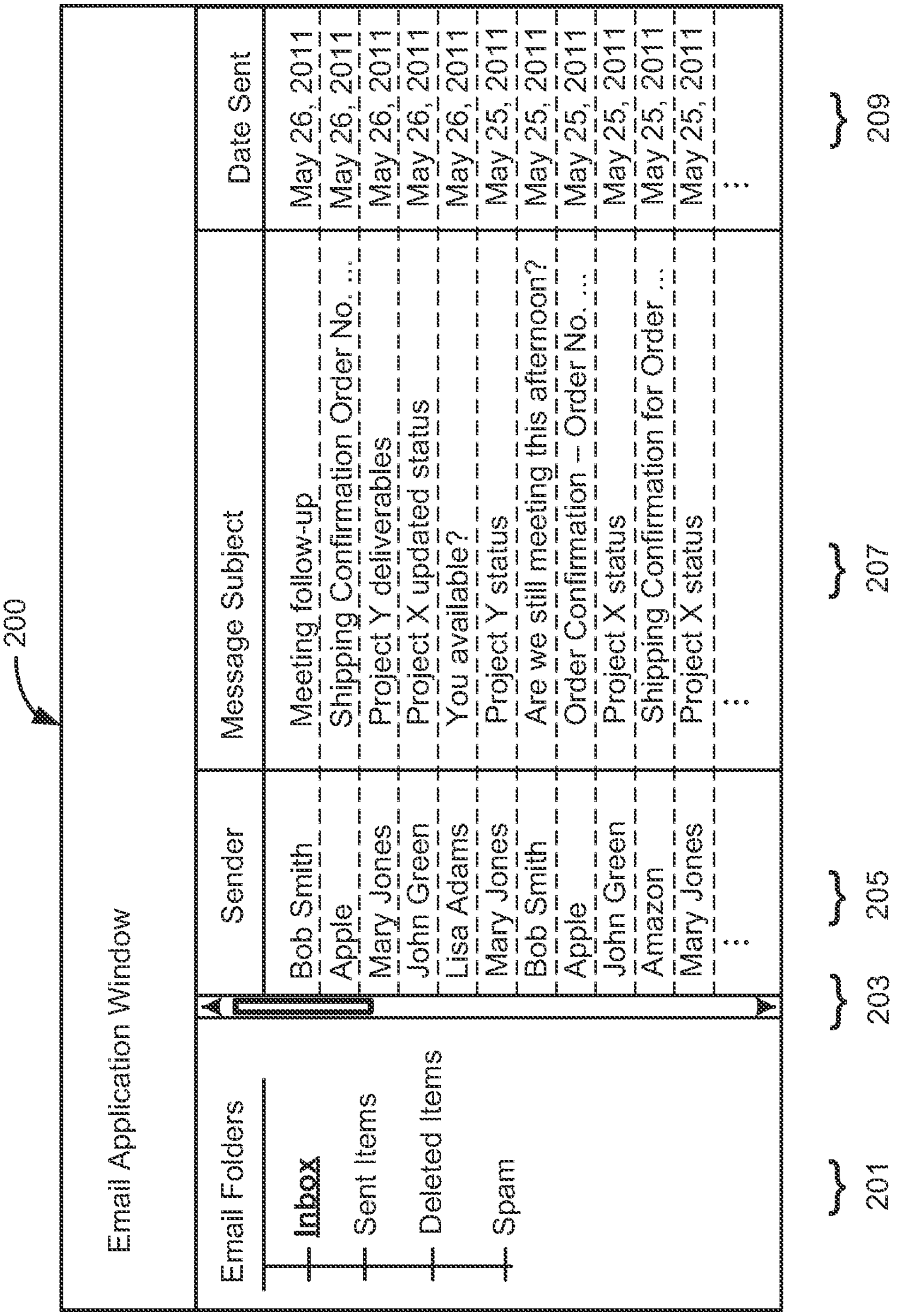
FIG. 2 is an exemplary prior art email application display window.

In step 405, email message headers are retrieved from the user's email mailbox using the access authorization obtained in step 403. As is known in the art, an email message typically has a header of data fields about the email message such as who was the sender of the message, what is the subject of the message, when was the message sent and who is to be the message recipient, etc. These header fields are what are typically used to populate an email application window as shown in FIG. 2. In one embodiment, the email message headers are retrieved from the user's email mailbox by aggregation server 310 communicating across network 102 to directly access the user's email mailbox in email server 101 of FIG. 3 using mail access protocols known in the art. In another embodiment, the email message headers are retrieved from the user's email mailbox by aggregation server 310 communicating across network 102 with a request to email server 101 of FIG. 3 to perform a search of the user's email messages and return those having an email message header with a sender being a known online merchant such as "Apple" or "Amazon" or an email message header with a subject line text that matches keywords such as "order confirmation," "shipping confirmation," etc. In yet another embodiment, the email message headers are retrieved from the user's email mailbox by aggregation server 310 communicating across network 102 with a request to email server 101 of FIG. 3 to perform a search of the user's email messages and return those having an email message header with the sender being an email address associated with ordering from or shipping by the online merchant (e.g., auto-confirm@amazon.com or ship-confirm@amazon.com).

In step 407, email messages of interest are identified. In one embodiment, this occurs within aggregation server 310 of FIG. 3 which filters the retrieved email message headers to identify email messages sent by a known online merchant. Examples include an email message header indicating that the email message was sent by "Apple" or by "Amazon." Another example is when an email message header indicates that the email message was sent by a third party known to send such email messages on behalf of an online merchant. This filtering process can also identify email messages of interest by recognizing those email message headers that contain text in the email message subject line that corresponds to known order confirmation subject line text or known shipping confirmation subject line text. Examples include an email message sent with a subject line containing the text "purchase," "order," "ordered," "shipment," "shipping," "shipped," "invoice," "confirmed," "confirmation," "notification," "receipt," "return," "pre-order," "pre-ordered," "tracking," "on its way," "received" "fulfilled," "ereceipt," "package," etc.

In step 409, the email message bodies for the identified email messages of interest are retrieved from the user's email mailbox using the access authorization obtained in step 403. As is known in the art, an email message typically has a message body which contains the main part of the email message itself and is what is typically viewed by a user when an email message is opened. In one embodiment, this retrieval is accomplished by aggregation server 310 requesting the email message body for the identified email messages of interest from email server 106 across network 102 of FIG. 3 using mail access protocols known in the art. Identification of which message bodies are being requested can be accomplished in various ways known in the art including requesting each by email message identifier obtained from the email message header of the identified email messages of interest in step 407. In an alternative embodiment, step 405 and step 409 are combined into a single retrieval step with identification step 407 occurring afterwards.

In step 411, the retrieved email message bodies for the identified email messages of interest are parsed to extract the order information and/or shipping information contained therein, Such parsing operation can occur in a variety of known ways. However, because the text contained in email message bodies is of a free form nature (as opposed to the structured tagged elements in a hypertext markup language (HTML) web page which delineate and make recognizable the various fields or elements of the web page), in one embodiment predefined templates are used that have been specifically created to identify the various individual elements or entities of interest in a given email from an online merchant. Use of these predefined templates to parse a retrieved email message body occurs within aggregation server 310 of FIG. 3 as will be explained further elsewhere herein.

Further, because it is known from step 407 which online merchant sent the email message of interest and whether the email message is an order confirmation or a shipping confirmation, a template specific to the online merchant and type of confirmation is used. Still further, because email message bodies can, as is known in the art, be in either a text or HTML format a template specific to the type of email message body format is used. It is to be understood that even though an email message body may be in an HTML format the email message body is still of a free form nature because it lacks recognizable structured tag elements that exist, for example, in an HTML web page.

As such, for each online merchant there are typically four different parsing templates which can be used in this embodiment: i) a text order confirmation template; ii) an HTML order confirmation template; iii) a text shipping confirmation template; and iv) an HTML shipping confirmation template. Of course, for some online merchants there are greater or fewer templates depending simply upon what are the various forms of confirmation email messages a given online merchant typically sends. Regardless of the number of templates for a given merchant, each template is specific as to the known particular entities typically included and the order they typically occur within each type of email confirmation message sent by that merchant.

In this embodiment, context-free grammars (CFGs) are used to parse fields from an identified email message of interest. Of note, however, is that rather than using grammars for parsing natural language (e.g., English) structures the present approach uses defined smaller grammars describing a particular email message format, for example: "(Greetings from merchant) (Details about order) (Details about item 1) (Details about item 2) . . . (Details about item N) (Tax and totals calculation)," etc. And although those of skill in the art commonly define CRGs in a format known as Backus-Naur Form (BNF), in this embodiment templates have been created so a user does not themselves have to define such grammars. It is to be understood, however, that these templates are used for data extraction rather than for the more common purpose of templates which is data generation.

The created templates are themselves a grammar. As such, these created templates are converted, using, for example, a tool known in the art as Another Tool for Language Recognition (ANTLR), into mail-specific grammars. ANTLR is then used again to convert these grammars into a mail-specific extraction parser which aggregation server 310 can then use to parse the email message bodies to extract the entities of interest from them. Examples of such extracted entities include merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, etc.

Aggregation server 310 can use other extract on parsers to parse the email message bodies to extract the entities of interest from them. In one embodiment, regular expression extraction can be used as a brute force pattern matching approach across the entire email message body. With this technique, each word in the email message body is matched against a set of rules. If the rules are met, the piece of text matching the set of rules is returned. For example, shipping companies frequently use a 21 digit tracking number beginning with "1Z" or "91", Aggregation server 310 can scan an entire email message body to find a 21 digit number with "1Z" or "91" as the first 2 digits. The matched text can then be extracted and used to determine shipping information (as discussed below).

In another embodiment, an HTML document object model (DOM) approach is used to parse email message body(ies), For example, the message body of an email shipping notification may contain HTML code with tags for order, shipping and/or tracking information. Aggregation server 310 can use these tags to identify the shipping and/or tracking information for extraction.

In step 413, the extracted product order and/or shipping information is stored. In one embodiment, if the email message of interest is an order confirmation then a new database record is created by aggregation server 310 in database 300 of FIG. 3 and the relevant information from the email message header and the extracted entities from the order confirmation email message body are added to the database record. Likewise, if the email message of interest is a shipping confirmation for a previously received order confirmation, then the relevant information from the email message header and the extracted entities from the shipping confirmation email message body are added to the previously created database record or is added as another record to the database.

In one embodiment an email message identifier of the email message of interest is also stored in the database record no that the email message of interest can later be retrieved from the user's email mailbox should that be desired for any reason. Alternatively, some or all of the email message itself can be stored in the database record for later retrieval. In another embodiment, the email message identifier (and/or anything else described herein as being stored in the database record including, e.g., the email message of interest) can be stored in a file system.

It is to be noted that sometimes a shipping confirmation email message for a given ordered product is identified as an email message of interest before an order confirmation email message for that ordered product is identified as an email message of interest. This can occur for various reasons, for example, in the case of an order confirmation email message not being received in the user's email mailbox or being deleted by a user or inadvertently treated as spam before the above process has occurred. Likewise, sometimes multiple identical or very similar order confirmation email messages or shipping confirmation email messages are sent by an online merchant or a shipping company thus seemingly causing duplicate confirmation email messages. Handling these out of sequence or duplicate email messages in a way that avoids multiple record entries for the same ordered product will now be explained.

Figure 5:
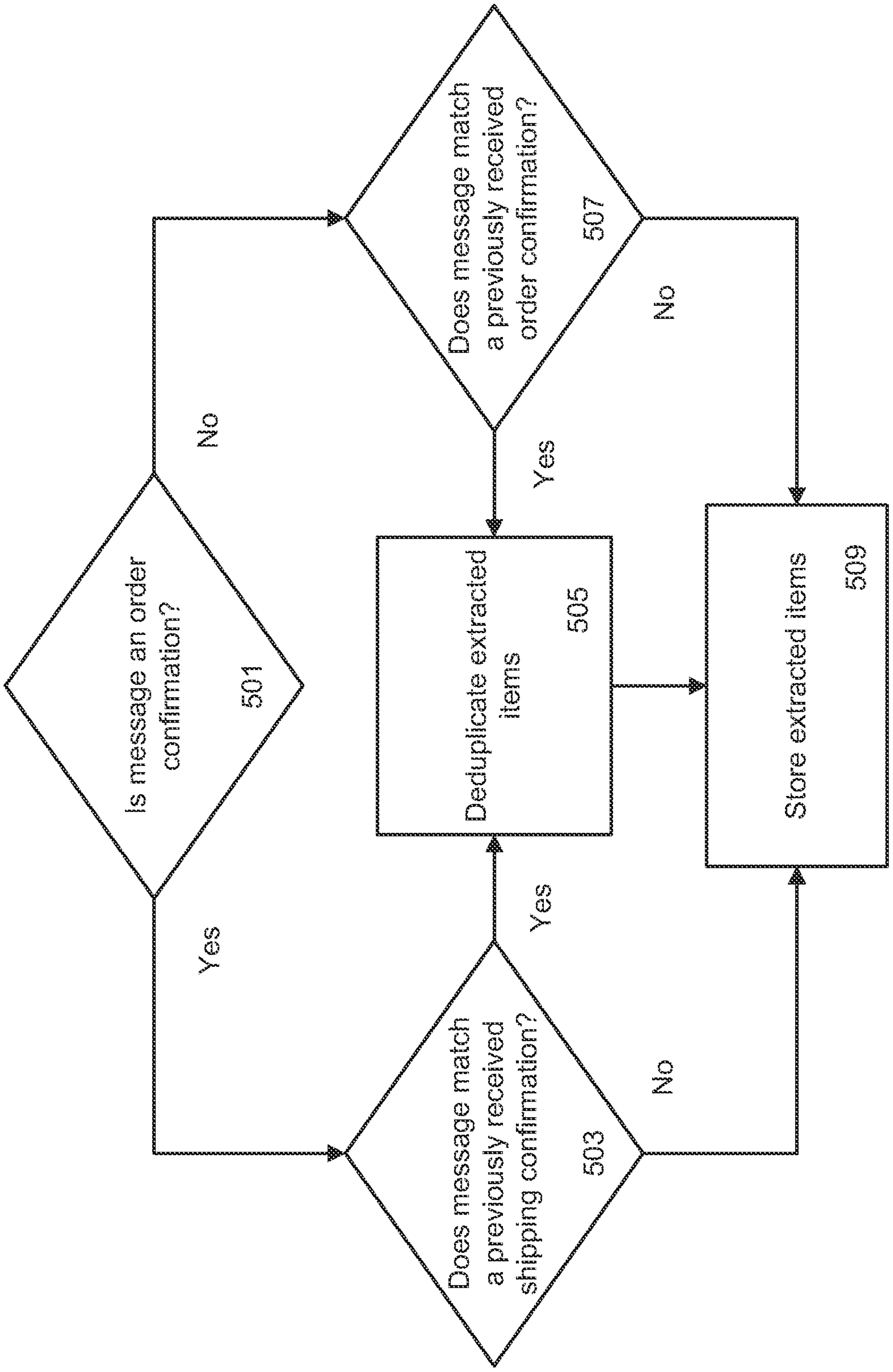
FIG. 5 is a flowchart depicting a method of handling out of sequence or duplicate email messages according to one embodiment.

Referring now to FIG. 5, a flowchart depicting a method of handling out of sequence or duplicate email messages according to one embodiment of the present approach can be seen. In one embodiment, this occurs within aggregation server 310 of FIG. 3 and is part of step 413 of FIG. 4.

In step 501, it is determined whether the identified email message of interest is an order confirmation message. If the identified email message of interest is an order confirmation message then, in step 503, it is determined whether it corresponds to a previously received shipping confirmation message. In one embodiment this determination is made by comparing extracted entity information such as order, number, item identification and/or stock keeping unit (SKU), item description, etc. If it does not correspond to a previously received shipping confirmation message then, in step 509, a database record is created and the extracted entities are stored in the database record. Alternatively, if it does correspond to a previously received shipping confirmation message then, in step 505, the extracted entities from the email message of interest are compared with previously stored extracted entities to eliminate any duplicate data (a deduplication process) before storing them, along with any extracted new entities, in the previously created database record in step 509.

Referring back to step 501, if the identified email message of interest is not an order confirmation message hence it is a shipping confirmation message) then, in step 507, it is determined whether it corresponds to a previously received order confirmation message. In one embodiment this determination is made using essentially the same process described above with respect to step 503. If it does not correspond to a previously received order confirmation then, in step 509, a database record is created and the extracted entities are stored in the database record. Alternatively, if it does correspond to a previously received order confirmation message then, in step 505, the extracted entities from the email message of interest are compared with previously stored extracted entities to eliminate any duplicate data (again, a deduplication process) before storing them, along with any extracted new entities, in the previously created database record in step 509.

It is to be understood that the process described with reference to FIG. 5 works when a single shipping confirmation email is received for a one or more products in a single order confirmation email as well as when multiple shipping confirmation emails are received each shipping confirmation email corresponding to less than all of the one or more products in a single order confirmation email.

Referring again to FIG. 4, in step 415, the extracted product order and/or shipping information is presented for display to the user. In the embodiment, the stored extracted product order and/or shipping information is retrieved from database 311 of FIG. 3. This information can then be sent across network 102 to user computing device 101 of FIG. 3, for display to the user as will now be explained.

Referring now to FIG. 6, an exemplary display of the extracted product order and/or shipping information can be seen. In this example, and/or shipping information aggregation (OSIA) application window 600, as may be displayed on user computing device 101 of FIG. 1, can be seen. Within OSIA application window 600 are various columns including slider bar 601, product order date column 603, product item description column 605, product price column 607, online merchant column 609 and product order/shipping status column 611.

In this example it is to be noted that each row displays a grouping of extracted entity product order and/or shipping information for an individual product. For example, the first display row shows in item description column 605 that an "iPad 2 tablet computing device" with "Order No. 123456" was ordered on "May 25, 2011," as shown in order date column 603, with a price of "$499.00," as shown in price column 607, from merchant "Apple," as shown in online merchant column 609, and the status of the order is that the product has "Shipped," as shown in status column 611. Also shown are other examples of extracted entity product order and/or shipping information for other individual products purchased from other online merchants.

The aggregated product order and shipping information presented in OSIA application window 600 can be augmented with other information for display on user computing device 101, including, for example, the product shipping status (discussed below with reference to FIG. 8), the product delivery status (discussed below with reference to FIGS. 9 and 10), the time remaining to return the product (discussed below with reference to FIG. 11), and the product image (discussed below with reference to FIG. 12).

Figure 7:
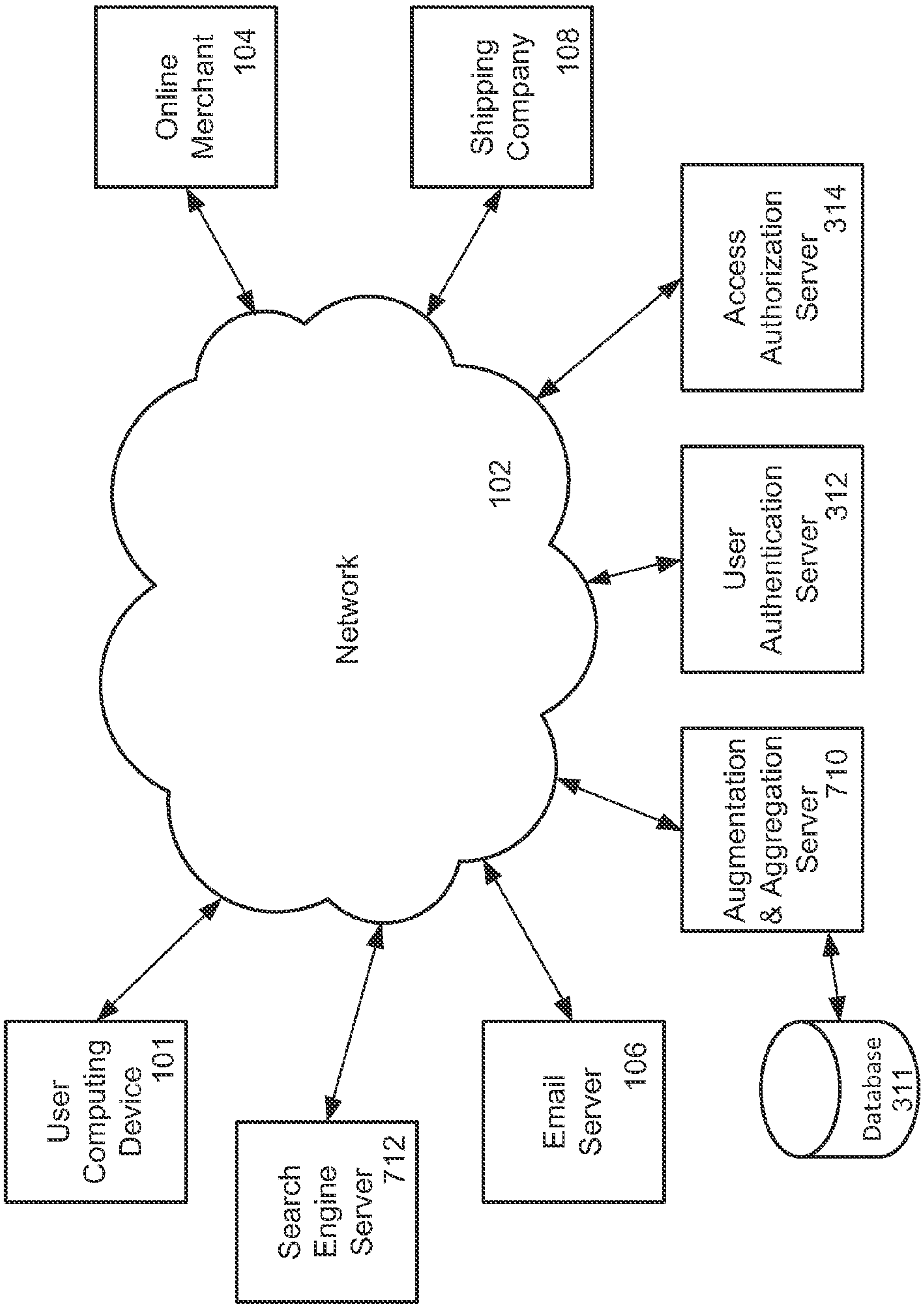
FIG. 7 is an exemplary embodiment and operating environment for augmenting aggregated emailed product order and shipping information.

Referring now to FIG. 7, an exemplary embodiment and operating environment for augmenting aggregated emailed product order and shipping information can be seen. As with the order and shipping process described with respect to FIGS. 1 and 3, a user operating user computing device 101 such as a personal computer, handheld computing device or smartphone communicates across network 102 such as the internet to online merchant 104 to shop for and consummate an online transaction to acquire some product. This is typically performed by the user operating an application such as a web browser running on the user computing device 101. The user can identify the product to be purchased or locate online merchant 104 by querying search engine server 712 across network 102. When the online transaction is complete, online merchant 104 typically sends details of the completed transaction to the user computing device 101 for display to the user typically in a window of the same web browser application running on the user computing device 101. Online merchant 104 also typically sends an email message to the user of user computing device 101 confirming the transaction. Such an order confirmation email message is typically sent from the online merchant 104 to email server 106 which is accessible to the user computing device 101 via an email application running on the user computing device 101. It is to be understood that email server 106 may be provided by the user's company or may be provided by a third party email service provider. Subsequently, when the order is ready to be shipped to the user either by the online merchant 104 or by the shipping company 108 acting on behalf of the online merchant 104, a shipping confirmation email message is typically sent from either the online merchant 104 or the shipping company 108 to the email server 106 which is, again, accessible to the user computing device 101 via the email application running on the user computing device.

Also present in the embodiment shown in FIG. 7 is an augmentation and aggregation server 710 and a search engine server 712 (e.g., GOOGLE, YAHOO, or BING). Augmentation and aggregation server 710 aggregates the order information and the shipping information contained in the order confirmation email messages and the shipping confirmation email messages (as discussed above with respect to aggregation server 310) and, in addition, augments the aggregated order and shipping information with updated shipping and delivery information, product images, and/or information about the time remaining to return the ordered product. In particular, augmentation and aggregation server 710 communicates across network 102 with (1) online merchant 104 and/or shipping company 108 to update the shipping and delivery information extracted and stored in database 311, (2) search engine server 712 and/or online merchant 104 to retrieve product images, (3) online merchant 104 to access its return policy which augmentation and aggregation server 710 then uses to determine the time remaining to return the ordered product, and (4) user computing device 101 to display to the user extracted and augmented product order and shipping information (typically grouped by individual product thus greatly simplifying user review of orders).

Augmentation and aggregation server 710 stores the augmented shipping, delivery, and/or product information for the given ordered product in database 311 within the database record containing aggregated information for the same ordered product.

The augmented aggregated product information (e.g., updated shipping and delivery information, product images, and time remaining to return the product) can be communicated to user computing device 101 before being stored or after being retrieved from storage.

Figure 8:
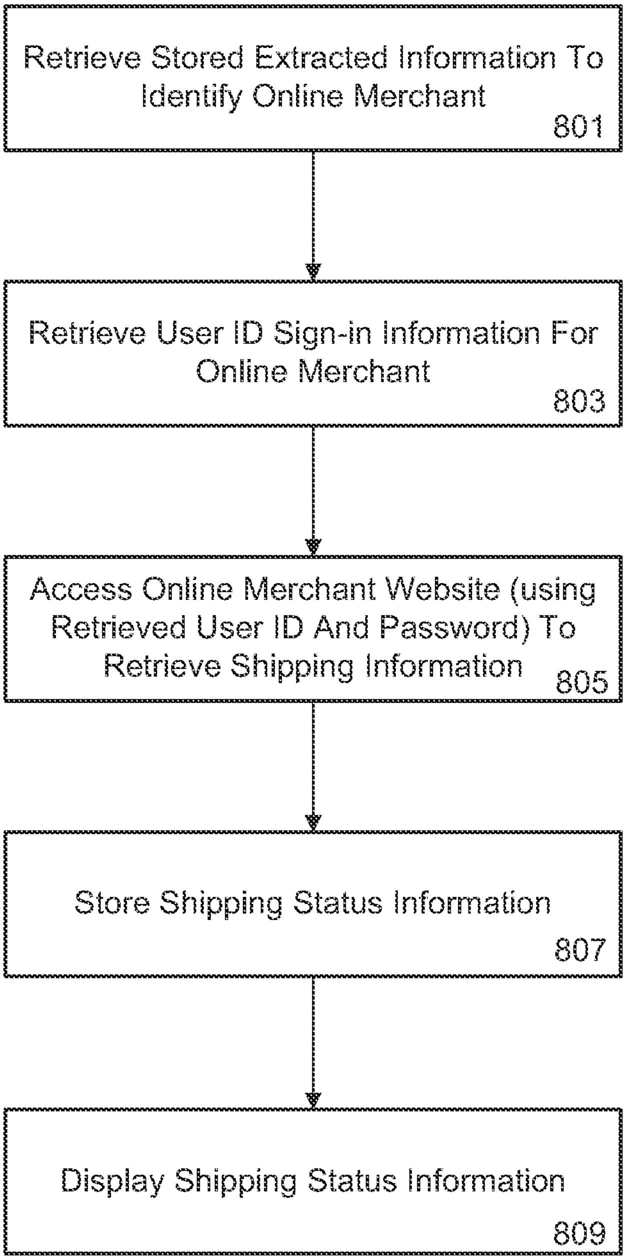
FIG. 8 is a flowchart depicting a method of tracking shipping status of a product order according to one embodiment.

Referring now to FIG. 8, a flowchart depicting a method of tracking shipping status (e.g., on order, backordered, to be shipped on x date, or shipped) of the product order according to one embodiment is presented. One of skill in the art will understand that the steps detailed in FIG. 8 typically occur at some point after retrieved email message body(ies) are parsed (as discussed above with respect to step 411 of FIG. 4), but in other embodiments can occur before or after extracted information is stored in database 311 (as discussed above with respect to step 413 of FIG. 4), or can occur after the extracted information is displayed (as discussed above with respect to step 415 of FIG. 4).

In step 801, augmentation and aggregation server 710 retrieves information about a given ordered product from the database record for that product (which record contains extracted entities from shipping and/or confirmation emails and is stored in database 311) to identify the online merchant of the ordered product.

In step 803, augmentation and aggregation server 710 obtains user sign-in information (e.g., a user identification and a password) to access shipping information for the ordered product on the website for the online merchant. The user identification and password can be obtained directly from the user by sending a request from augmentation and aggregation server 710 through network 102 to user computing device 101.

In step 805, augmentation and aggregation server 710 uses the obtained user sign-in information to sign into the user's account for online merchant 104 and perform the equivalent of the user manually accessing a merchant webpage containing the shipping information.

In step 807, augmentation and aggregation server 710 stores the Obtained shipping information in the previously created database record for the product in database 311.

In step 809, the stored shipping information can then be retrieved from database 311 and sent across network 102 to user computing device 101 for display.

In an alternate embodiment, the stored shipping information can be sent across network 102 to user computing device 101 for display before being stored (i.e., before step 807).

Figure 9:
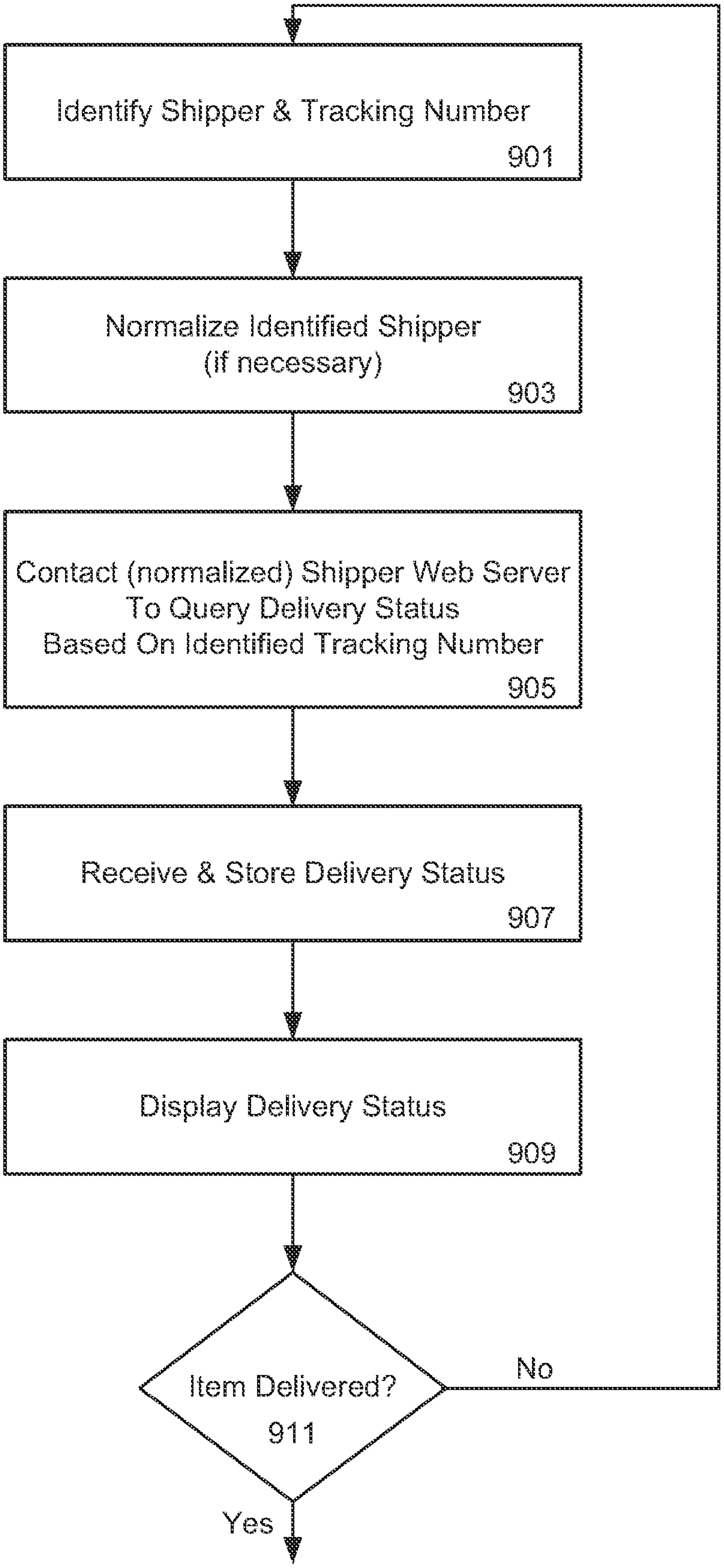
FIG. 9 is a flowchart depicting a method of tracking delivery status of the product order according to one embodiment.

Referring now to FIG. 9, a flowchart depicting a method of tracking delivery status of the product order according to one embodiment is presented. Tracking delivery status is performed on a per package basis the package can comprise more than one ordered product). One of skill in the art will understand that the steps detailed in FIG. 9 typically occur at some point after retrieved email message body(ies) are parsed (as discussed above with respect to step 411 of FIG. 4), but in other embodiments can occur before or after extracted information is stored in database 311 (as discussed above with respect to step 413 of FIG. 4), or can occur after the extracted information is displayed (as discussed above with respect to step 415 of FIG. 4).

In step 901, augmentation and aggregation server 710 retrieves, for a given ordered product, the identity of shipping company 108 and the tracking number for the product from the database record for that product stored in database 311.

In step 903, augmentation and aggregation server 710 normalizes the identity of the shipping company, if necessary. As is known, shipping providers can be referenced in shipping confirmation entails by different aliases (e.g., United States Postal Service is also referenced as Postal Service, US Postal Service, and United States Postal Services), may operate similar shipping businesses under different names (e.g., UPS and UPS Mail Innovations) or offer different mailing options under different names (e.g., Federal Express, FedEx Priority Overnight, and SmartPost). Thus, if the identity of the shipping company retrieved in step 901 is an alias for a known shipping company, the retrieved identified shipper for the ordered product is normalized to that known shipping company. A list of exemplary shipping company aliases (grouped by known shipping company) is presented in FIG. 10.

Referring again to FIG. 9, in step 905, augmentation and aggregation server 710 places a hypertext transfer protocol (HTTP) call to the website of the identified (normalized if necessary) shipper to query delivery status of the product order based on the identified tracking number.

In step 907, augmentation and aggregation server 710 receives and stores delivery status data from the shipper website. The received delivery status data can include the current location of the product shipment (e.g., city and/or state), the estimated delivery date and/or time, and/or the delivery date and time (if already delivered). Augmentation and aggregation server 710 stores the received delivery status data in database 311.

In an alternate embodiment, the delivery status data can be sent across network 102 to user computing device 101 for display before being stored (i.e., after receiving the delivery status data in step 907, but before storing the delivery status data).

In step 909, the stored delivery status data can then be retrieved from database 311 and sent across network 102 to user computing device 101 for display.

In step 911, augmentation and aggregation server 710 determines from the stored delivery status data whether the product has been delivered. If the product has not been delivered, then augmentation and aggregation server 710 loops through steps 901, 903, 905, 907, 909, and 911 periodically (e.g., every 3 hours, or multiple times per day) to check for delivery status updates. Augmentation and aggregation server 710 terminates the periodic looping for delivery status updates once the product has been delivered (as indicated by the shipper). Augmentation and aggregation server 710 can also update delivery status by executing steps 901, 903, 905, 907, 909, and 911 when the user accesses the OSIA application.

Figure 11:
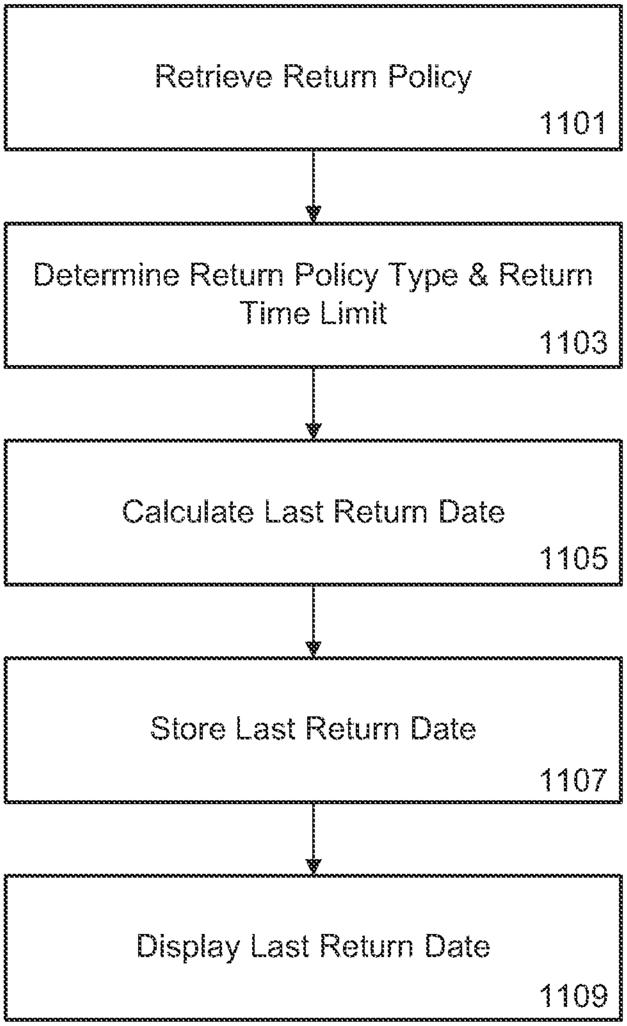
FIG. 11 is a flowchart depicting one embodiment of a method of determining a last date to return a product according to an online merchant's return policy.

Referring now to FIG. 11, a flowchart depicting one embodiment of a method of determining a last date to return the product according to the online merchant's return policy is presented. One of skill in the art will understand that the steps detailed in FIG. 11 typically occur at some point after retrieved email message body(ies) are parsed (as discussed above with respect to step 411 of FIG. 4), but in other embodiments can occur before or after extracted information is stored in database 311 (as discussed above with respect to step 413 of FIG. 4), or can occur after the extracted information is displayed (as discussed above with respect to step 415 of FIG. 4).

The return policy is obtained by manually accessing an online merchant's website. The return policy is then stored in database 311.

In step 1101, the return policy is retrieved from database 311.

In step 1103, the retrieved return policy is manually analyzed to determine a date type of return policy and a return policy time limit (the number of days allowed by the policy to return the product). Return policies are categorized by the governing date specified by the return policy (i.e., whether the return policy is governed by the product order date, the product shipping date, or the product delivery date). Because online merchant return policies can mandate different return periods for different categories of products (e.g., electronics can have a 30-day return period, whereas shoes may have a 6-month return period), the most conservative return policy time limit is used, in one embodiment, for products from the online merchant. As an example, if online merchant A requires electronics returns within 30 days, suits within 60 days, and shoes within 6 months, the default return policy time limit is stored in database 311 as 30 days. This embodiment avoids overstating the return policy time limit based on an incorrect product classification, thus ensuring that the user can return the product within the determined return time period regardless of the actual product category.

In step 1105, augmentation and aggregation server 710 calculates the last date that the user can return the product ("last return date") based on the determined category of return policy and the determined return policy time limit.

In step 1107, augmentation and aggregation server 710 stores the calculated last return date in the previously created database record for the product in database 311.

In step 1109, augmentation and aggregation server 710 retrieves the stored last return date from database 311 and sends it across network 102 to user computing device 101 for display. The display can then be presented as the last date for product return, or can be displayed as a countdown timer such that the amount of time remaining to return the product is shown (e.g., 3 days remaining).

In an alternate embodiment, the calculated last return date can be sent across network 102 to user computing device 101 for display before being stored (i.e., before step 1107).

Figure 12:
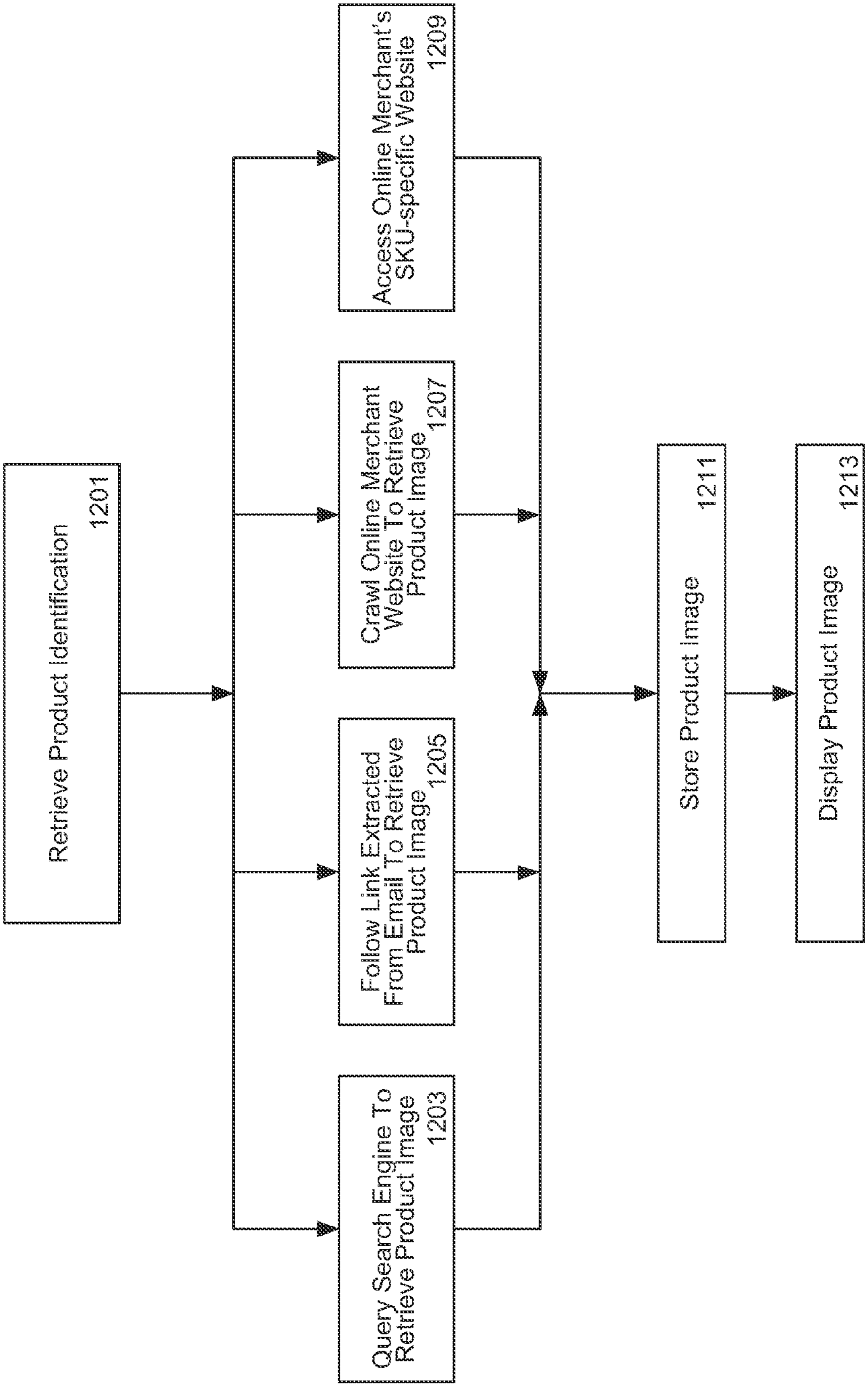
FIG. 12 is a flowchart depicting a method of acquiring product images for display in an order/shipping information aggregation application window according to one embodiment.

Referring now to FIG. 12, a flowchart detailing a method to retrieve and display a product image according to one embodiment is presented. One of skill in the art will understand that the steps detailed in FIG. 12 typically occur at some point after retrieved email message body(ies) are parsed (as discussed above with respect to step 411 of FIG. 4), but in other embodiments can occur before or after extracted information is stored in database 311 (as discussed above with respect to step 413 of FIG. 4), or can occur after the extracted information is displayed (as discussed above with respect to step 415 of FIG. 4).

In step 1201, augmentation and aggregation server 710 retrieves product identification information about a given ordered product from database 311. Retrieved information can include, for example, a product name, a product description, a product model number, a stock-keeping unit (SKU), and a manufacturer of the product. Once the product identification information has been retrieved, augmentation and aggregation server can obtain an image of the product in various ways.

In one embodiment, in step 1203, augmentation and aggregation server 710 uses the retrieved product identification information to query a web search engine (through network connection 102 to search engine server 712) for an image of the product. One of skill in the art will understand that an application programming interface (API) of a given search engine server can be accessed to perform the query. In another embodiment, augmentation and aggregation server 710 uses the retrieved product identification information to access the website of online merchant 104 (through network connection 102) to query a merchant-specific search engine on the website of online merchant 104 for the product image.

In another embodiment, in step 1205, augmentation and aggregation server 710 obtains the hyperlink to the product image and follows the hyperlink to retrieve the product image. One of skill in the art wilt understand that the hyperlink can have been stored in the database record for that product in database 311 after being extracted during earlier parsing of the order confirmation or shipping email message bodies, or that the order confirmation or shipping email message bodies can be parsed for the hyperlink if and when the product image is desired.

In yet another embodiment, in step 1207, augmentation and aggregation server 710 crawls the website of online merchant 104 for the product image. One of skill in the art will understand that a web crawler can search the website of online merchant 104 to locate offered products and maintain an index of the merchant's offered products with the location on the merchant's website of the associated product images for the offered products. Alternatively, the web crawler can search the website of online merchant 104 to locate images of offered products, send the images to augmentation and aggregation server 710 which can, in turn, store the images locally in a database (e.g., database 311), and maintain an index of the databased images of merchant's offered products. The index can be stored in database 311 or another third-party (local or remote) database to facilitate access to the product images at a later time.

In another embodiment, in step 1209, the product image can be retrieved from the website of an online merchant with SKU-specific product pages. In this embodiment, aggregation and augmentation server 710 has knowledge of online merchants' website structures, and can use retrieved product identification information (e.g., the SKU for the product of interest) to access the product page identified for the product SKU to obtain the product image. As an example, if the ordered product is a DVD from Netflix, aggregation and augmentation server 710 can access a product-unique webpage at NETFLIX (defined as "Netflix.com/productid=SKU" where SKU is the SKU for the product of interest) to obtain the product image.

The methods of steps 1203, 1205, and 1207, 1209 can be implemented as separate embodiments, or, alternatively, any two, three, or four of these methods (e.g., steps 1203 and 1205, or steps 1205 and 1207, or steps 1203 and 1207, or steps 1203, 1205, and 1207, or steps 1203, 1205, 1207, and 1209) can be implemented in one embodiment.

Once the product image is retrieved, then in step 1211, the product image is added to the previously created database record for the product in database 311. In step 1213, the stored product image is retrieved from database 311 and sent across network 102 to user computing device 101 for display.

In an alternate embodiment, the product image can be sent across network 102 to user computing device 101 for display before being stored (i.e., before step 1211).

Figure 13:
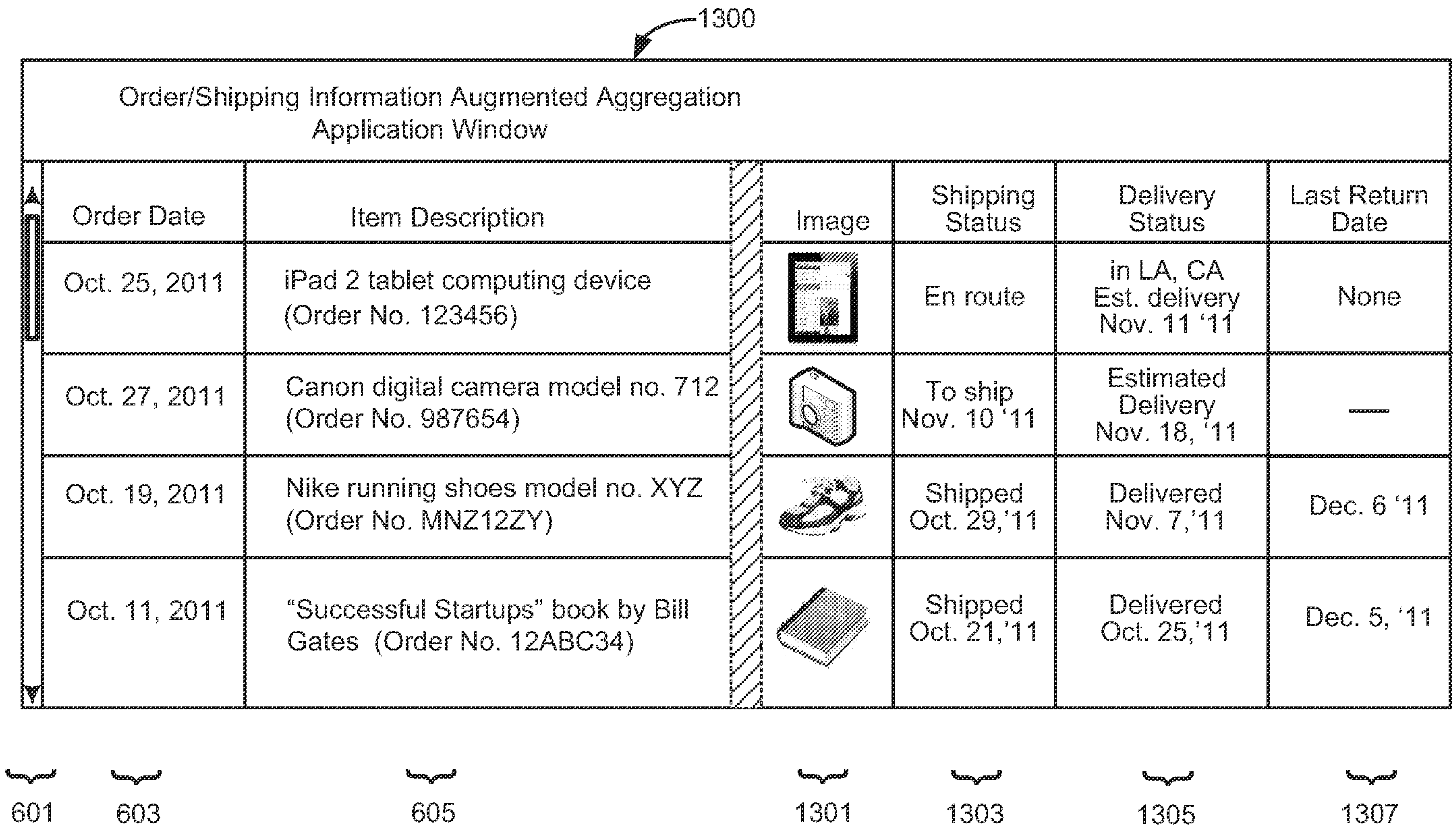
FIG. 13 is an exemplary display of augmented aggregated product order and/or shipping information.

Referring now to FIG. 13, an augmented OSIA application window 1300 for display on user computing device 101 is presented which shows the same ordered products shown in OSIA application window 600 (FIG. 6), with additional columns shown (product image 1301, shipping status 1303, delivery status 1305, and last return date 1307) containing exemplary product information. The hatched bar in the center of the figure is used to indicate that the columns containing "price", "merchant", and "status" information shown in FIG. 6 would be present, but have been omitted from this figure for clarity of presentation. As can be seen in FIGS. 6 and 13, OSIA application window 600 and 1300 present clear views of basic aggregated product information (FIG. 6) that can be augmented (FIG. 13) as described herein to provide additional product information.

In one embodiment, OSIA application window 1300 is augmented with product images (obtained as described above in steps 1203, 1205, 1207, and/or 1209 with respect to FIG. 12) retrieved from database 311. In an alternate embodiment, OSIA application window 1300 is augmented with product images not yet stored in database 311. In this embodiment, JavaScript code in the browser application running on user computing device 101 accesses a search engine server (e.g., GOOGLE image search via an API) to search for and obtain the product image using product identification information. Once Obtained, the product image can be displayed in OSIA application window 1300 and communicated from user computing device 101 across network 102 to aggregation and augmentation server 710 for storage in database 311. Once stored, the stored product image can be retrieved from database 311 for display during subsequent generation of OSIA application window 1300.

It is to be understood that although the examples shown in FIGS. 6 and 12 are displays of the extracted product order and/or shipping information in an OSIA application window, this same information can, instead, be displayed within a display window of some other application running on either the aggregation server 310, augmentation and aggregation server 710, or user computing device 101 such as, for example, an email application.

It is to be understood that although the examples and description herein refer to the merchant as an online merchant, the present approach is equally applicable to any merchant, online or otherwise, who provides such order and/or shipping confirmation emails.

It is to be understood that, while a number of the examples are described herein as operations running on, for example aggregation server 310 or augmentation and aggregation server 710, the described operations can all be implemented in software stored in a computer readable storage medium for access as needed to either run such software on the appropriate processing hardware of a server or user computing device.

It is to be understood that the examples noted here are only for illustrative purposes and there may be further embodiments possible with a different set of components. While several embodiments are described, there is no intent to limit the disclosure to the embodiment or embodiments disclosed herein. On the contrary, the intent is to cover all alternatives, modifications, and equivalents obvious to the ones familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A computer-implemented method, comprising:

identifying electronic messages concerning respective product orders in respective collections of electronic messages transmitted between network nodes and stored in one or more non-transitory networked electronic message storage systems;

for each of respective ones of the identified electronic messages, selecting a respective extraction parser corresponding to the identified electronic message, wherein each extraction parser is generated from a respective template defining a respective context-free grammar that describes a respective format of an electronic message body comprising an ordered arrangement of unstructured free form text elements, and applying, by a processor, the selected extraction parser to unstructured free form text in a body portion of the identified electronic message to extract therefrom a respective set of product order related data values corresponding to a predefined set of purchase order related data field types;

storing the sets of extracted product order related data values as aggregated data in a non-transitory networked data storage system;

for each of respective ones of the sets of extracted product order related data values, retrieving additional information concerning product order information missing from the respective set of extracted product order related data values based on one or more of the extracted product order related data values in the respective set of extracted product order related data values; and augmenting the aggregated data with the retrieved additional information.

2. The method of claim 1, wherein the identified purchase-related electronic messages comprise electronic mail messages.

3. The method of claim 1, wherein, for each of one or more of the sets of extracted product order related data values:

the retrieving comprises retrieving a respective image of an ordered product corresponding to the respective product order from a remote server; and the augmenting comprises augmenting the aggregated data with the retrieved image.

4. The method of claim 1, wherein, for each of one or more of the sets of extracted product order related data values, the retrieving comprises retrieving a respective shipping status of the respective product order from a respective one of the identified electronic messages.

5. The method of claim 1, wherein, for each of one or more of the sets of extracted product order related data values, the retrieving comprises retrieving a respective delivery status of the respective product order from a respective one of the identified electronic messages.

6. The method of claim 1, wherein, for each of one or more of the sets of extracted product order related data values, the retrieving comprises retrieving a respective last date to return an ordered product corresponding to the respective product order.

7. The method of claim 1, wherein the selecting of the respective extraction parser is based on identification of a type of the respective identified electronic message selected from a predefined set of electronic message types.

8. The method of claim 7, wherein the predefined set of electronic message types comprises an order confirmation message type and a shipping confirmation message type.

9. The method of claim 8, wherein, for each of one or more of the product orders:

the storing comprises, in a respective database record, storing a respective one of the sets of product order related data values extracted from a respective electronic message concerning the product order and corresponding to the order confirmation message type;

the retrieving comprises retrieving shipping information from a respective electronic message concerning the product order and corresponding to the shipping confirmation message type; and the augmenting comprises incorporating the retrieved shipping information into the respective database record.

10. The method of claim 8, further comprising, for each of respective ones of the identified electronic messages corresponding to the order confirmation message type, the applying comprises extracting purchase order related information comprising one or more of an order number, a product description, a product name, a product price, and an order total.

11. The method of claim 8, further comprising, for each of respective ones of the identified electronic messages corresponding to the shipping confirmation message type, the applying comprises extracting purchase-related information comprising one or more of a tracking number, a shipping address, a billing address, an estimated shipping date, and an estimated delivery date.

12. The method of claim 1, further comprising, in response to a request from a client network node associated with a user, transmitting data for displaying on the client network node a view based on the augmented aggregated data comprising purchase-related information extracted from respective ones of the identified purchase-related electronic messages and additional information concerning missing product order information retrieved based on respective ones of the sets of extracted purchase-related information.

13. The method of claim 1, further comprising: to a client network node associated with a user, transmitting data for generating a view on the augmented aggregated data associated with the user grouped by individual ordered product.

14. The method of claim 1, further comprising:

for each of multiple merchants, determining at least one respective template that defines a respective context-free grammar that describes a respective language and a respective format of a purchase-related electronic message body based on an instance of a purchase-related electronic message associated with the merchant; and converting, by a processor, each template into a respective extraction parser that is associated with the respective merchant based on the respective context-free grammar.

15. A system, comprising a non-transitory memory storing processor-readable instructions, and a processor coupled to the memory, operable to execute the instructions, and based at least in part on the execution of the instructions operable to perform operations comprising:

identifying electronic messages concerning respective product orders in respective collections of electronic messages transmitted between network nodes and stored in one or more non-transitory networked electronic message storage systems;

for each of respective ones of the identified electronic messages, selecting a respective extraction parser corresponding to the identified electronic message, wherein each extraction parser is generated from a respective template defining a respective context-free grammar that describes a respective format of an electronic message body comprising an ordered arrangement of unstructured free form text elements, and applying, by a processor, the selected extraction parser to unstructured free form text in a body portion of the identified electronic message to extract therefrom a respective set of product order related data values corresponding to a predefined set of purchase order related data field types;

storing the sets of extracted product order related data values as aggregated data in a non-transitory networked data storage system;

for each of respective ones of the sets of extracted product order related data values, retrieving additional information concerning product order information missing from the respective set of extracted product order related data values based on one or more of the extracted product order related data values in the respective set of extracted product order related data values; and augmenting the aggregated data with the retrieved additional information.

16. The system of claim 15, wherein, based at least in part on the execution of the instructions, the processor is operable to perform operations further comprising, in response to a request from a client network node associated with a user, transmitting data for displaying on the client network node a view based on the augmented aggregated data comprising purchase-related information extracted from respective ones of the identified purchase-related electronic messages and additional information concerning missing product order information retrieved based on respective ones of the sets of extracted purchase-related information.

17. The system of claim 15, wherein, based at least in part on the execution of the instructions, the processor is operable to perform operations further comprising: to a client network node associated with a user, transmitting data for generating a view on the augmented aggregated data associated with the user grouped by individual ordered product.

18. At least one non-transitory computer readable medium comprising instructions, which when executed by computer apparatus, cause the computer apparatus to perform operations comprising:

identifying electronic messages concerning respective product orders in respective collections of electronic messages transmitted between network nodes and stored in one or more non-transitory networked electronic message storage systems;

for each of respective ones of the identified electronic messages, selecting a respective extraction parser corresponding to the identified electronic message, wherein each extraction parser is generated from a respective template defining a respective context-free grammar that describes a respective format of an electronic message body comprising an ordered arrangement of unstructured free form text elements, and applying, by a processor, the selected extraction parser to unstructured free form text in a body portion of the identified electronic message to extract therefrom a respective set of product order related data values corresponding to a predefined set of purchase order related data field types;

storing the sets of extracted product order related data values as aggregated data in a non-transitory networked data storage system;

for each of respective ones of the sets of extracted product order related data values, retrieving additional information concerning product order information missing from the respective set of extracted product order related data values based on one or more of the extracted product order related data values in the respective set of extracted product order related data values; and augmenting the aggregated data with the retrieved additional information.

19. The at least one non-transitory computer readable medium of claim 18 comprising instructions, which when executed by computer apparatus, cause the computer apparatus to perform operations further comprising: in response to a request from a client network node associated with a user, transmitting data for displaying on the client network node a view based on the augmented aggregated data comprising purchase-related information extracted from respective ones of the identified purchase-related electronic messages and additional information concerning missing product order information retrieved based on respective ones of the sets of extracted purchase-related information.

20. The at least one non-transitory computer readable medium of claim 18 comprising instructions, which when executed by computer apparatus, cause the computer apparatus to perform operations further comprising: to a client network node associated with a user, transmitting data for generating a view on the augmented aggregated data associated with the user grouped by individual ordered product.

* * * * *

UNITED STATES PATENT AND TRADEMARK OFFICE

CERTIFICATE OF CORRECTION

PATENT NO. : 9,563,915 B2
APPLICATION NO. : 14/684658
DATED : February 7, 2017
INVENTOR(S) : Brady et al.

It is certified that error appears in the above-identified patent and that said Letters Patent is hereby corrected as shown below:

In the Specification

Column 11, Line 18, replace “CRGs” with --CFGs--.
Column 12, Line 10, replace “no” with --so--.

Signed and Sealed this
Second Day of January, 2018

Joseph Matal

*Performing the Functions and Duties of the*
*Under Secretary of Commerce for Intellectual Property and*
*Director of the United States Patent and Trademark Office*